US010531327B2

United States Patent
Uchiyama et al.

(10) Patent No.: US 10,531,327 B2
(45) Date of Patent: Jan. 7, 2020

(54) DEVICE AND A METHOD FOR MEASURING A CHANNEL QUALITY OF A SECONDARY CELL IN AN ON/OFF STATE

(71) Applicant: Sony Corporation, Tokyo (JP)

(72) Inventors: Hiromasa Uchiyama, Tokyo (JP); Hiroaki Takano, Saitama (JP); Atsushi Yoshizawa, Kanagawa (JP); Shinichiro Tsuda, Kanagawa (JP); Sho Furuichi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/401,117

(22) Filed: May 2, 2019

(65) Prior Publication Data

US 2019/0261207 A1    Aug. 22, 2019

Related U.S. Application Data

(63) Continuation of application No. 15/303,637, filed as application No. PCT/JP2015/056428 on Mar. 4, 2015, now abandoned.

(30) Foreign Application Priority Data

May 20, 2014    (JP) ................................ 2014-104239

(51) Int. Cl.
*H04W 4/00* (2018.01)
*H04W 24/10* (2009.01)
(Continued)

(52) U.S. Cl.
CPC ......... *H04W 24/10* (2013.01); *H04J 11/0093* (2013.01); *H04L 5/001* (2013.01);
(Continued)

(58) Field of Classification Search
None
See application file for complete search history.

(56) References Cited

U.S. PATENT DOCUMENTS

| | | | |
|---|---|---|---|
| 2014/0211763 A1* | 7/2014 | Choi | H04W 36/20 370/332 |
| 2014/0302865 A1* | 10/2014 | Bai | H04W 24/10 455/452.1 |

(Continued)

FOREIGN PATENT DOCUMENTS

| | | |
|---|---|---|
| EP | 2 355 579 A1 | 8/2011 |
| EP | 3 099 099 A1 | 11/2016 |

(Continued)

OTHER PUBLICATIONS

International Search Report dated May 26, 2015 in PCT/JP15/056428 Filed Mar. 4, 2015.

(Continued)

*Primary Examiner* — Zewdu A Beyen
(74) *Attorney, Agent, or Firm* — Xsensus LLP

(57) ABSTRACT

[Object] To make it possible to perform measurement reporting suitable for an environment in which the on/off state of a cell is switched.

[Solution] There is provided a device including: an acquiring unit configured to acquire information indicating that a serving cell is scheduled to be in an off state; and a control unit configured to perform measurement reporting before the serving cell is in the off state.

8 Claims, 28 Drawing Sheets

(51) Int. Cl.
*H04W 84/10* (2009.01)
*H04L 5/00* (2006.01)
*H04L 12/26* (2006.01)
*H04W 36/00* (2009.01)
*H04J 11/00* (2006.01)
*H04L 12/801* (2013.01)
*H04W 28/02* (2009.01)
*H04W 88/02* (2009.01)

(52) U.S. Cl.
CPC ............ *H04L 5/0098* (2013.01); *H04L 43/00* (2013.01); *H04L 47/29* (2013.01); *H04W 28/0278* (2013.01); *H04W 36/00* (2013.01); *H04W 84/10* (2013.01); *H04W 88/02* (2013.01)

(56) References Cited

U.S. PATENT DOCUMENTS

| | | | |
|---|---|---|---|
| 2014/0313920 A1* | 10/2014 | Chai | H04W 24/10 370/252 |
| 2015/0296560 A1* | 10/2015 | Sadek | H04W 72/1215 370/336 |
| 2015/0305084 A1* | 10/2015 | Ji | H04W 52/0216 370/311 |
| 2015/0326335 A1* | 11/2015 | Chen | H04J 11/0079 370/252 |
| 2015/0327106 A1* | 11/2015 | Lee | H04W 52/02 370/252 |
| 2015/0327233 A1* | 11/2015 | Liu | H04W 56/0015 370/329 |
| 2016/0043843 A1* | 2/2016 | Liu | H04L 5/0048 370/329 |
| 2017/0150294 A1* | 5/2017 | Wang | H04W 4/70 |

FOREIGN PATENT DOCUMENTS

| | | |
|---|---|---|
| JP | 2014-27469 A | 2/2014 |
| JP | 2014-53971 A | 3/2014 |
| WO | 2009/064931 A1 | 5/2009 |
| WO | 2013/190929 A1 | 12/2013 |
| WO | 2014/109561 A1 | 7/2014 |

OTHER PUBLICATIONS

ZTE: "Discussion on open issues of small cell on/off and discovery", 3GPP Draft; RI-141405 Discussion on Open Issues of Small Cell Onoff and Discovery, 3rd Generation Partnership Project (3GPP), Mobile Competence Centre ; 650, Route Des Lucioles ; F-06921 S0phia-Antip0 9 vol. RAN WG1, No. Shenzhen, China; Mar. 31, 2014-Mar. 30, 2014 Mar. 30, 2014 (Mar. 30, 2014), XP050787075, Retrieved from the Internet: URL:http://www.3gpp.org/ftp/Meetings_3GPP_SYNC/RAN1/Docs/[retrieved on Mar. 30, 2014] p. 3.

Sujuan Feng et al: "Self-Organizing Networks (S0N) in 3GPP Long Term Evolution", Internet Citation, May 20, 2008 (May 20, 2008), pp. 1-15, XP002526917, Retrieved from the Internet: URL:http://www.nomor-research.de/uploads/gc/TQ/gcTQfDWApo9osPfQwQoBzw/SelfOrganising NetworksInLTE_2008-05.pdf [retrieved on May 5, 2009] p. 9, paragraphs 3, 4.

Supplementary Partial European Search Report, dated Dec. 15, 2017, issued in corresponding European Patent Application No. 15795788.7.

Extended European Search Report dated Apr. 5, 2019, issued in corresponding European Patent Application No. 15795788.7.

U.S. Office Action dated Jul. 11, 2018, issued in corresponding U.S. Appl. No. 15/303,637.

* cited by examiner

FIG. 5

| SFN | | SUBFRAME | | | | | | | | | |
|---|---|---|---|---|---|---|---|---|---|---|---|
| | | 0 | 1 | 2 | 3 | 4 | 5 | 6 | 7 | 8 | 9 |
| 0 | GAP | G | G | G | G | G | G | | | | |
| 1 | | | | | | | | | | | |
| 2 | | | | | | | | | | | |
| 3 | | | | | | | | | | | |
| 4 | GAP | G | G | G | G | G | G | | | | |
| 5 | | | | | | | | | | | |
| 6 | | | | | | | | | | | |
| 7 | | | | | | | | | | | |
| 8 | GAP | G | G | G | G | G | G | | | | |
| 9 | | | | | | | | | | | |

DEVICE AND A METHOD FOR MEASURING A CHANNEL QUALITY OF A SECONDARY CELL IN AN ON/OFF STATE

CROSS-REFERENCE TO RELATED APPLICATIONS

This application is a continuation of U.S. application Ser. No. 15/303,637, filed on Oct. 12, 2016, which is based on PCT filing PCT/JP2015/056428, filed on Mar. 4, 2015, and claims priority to JP 2014-104239, filed on May 20, 2014, the entire contents of each are incorporated herein by reference.

TECHNICAL FIELD

The present disclosure relates to a device.

BACKGROUND ART

In cellular systems according to communication standards such as Long Term Evolution (LTE), a terminal device performs measurement based on a reference signal for cell selection/cell reselection and a handover.

Various technologies for measurement performed by a terminal device are proposed. For example, Patent Literature 1 discloses a technology in which a measurement gap is assigned to more component carriers as channel quality decreases.

CITATION LIST

Patent Literature

Patent Literature 1 JP 2014-53971A

SUMMARY OF INVENTION

Technical Problem

However, in an environment in which an on/off state of a cell (for example, a small cell) is switched, there is a possibility of measurement reporting suitable for the environment not being performed.

Thus, it is preferable to provide a mechanism through which it is possible to perform measurement reporting suitable for an environment in which the on/off state of a cell is switched.

Solution to Problem

According to the present disclosure, there is provided a device including: an acquiring unit configured to acquire information indicating that a serving cell is scheduled to be in an off state; and a control unit configured to perform measurement reporting before the serving cell is in the off state.

In addition, according to the present disclosure, there is provided a device including a control unit configured to perform measurement reporting according to a generation of a first event regarding a measurement result of a neighbour cell in an on state. The control unit performs measurement reporting according to a generation of a second event regarding a measurement result of a neighbour cell in an off state. The first event and the second event have different offsets or thresholds.

In addition, according to the present disclosure, there is provided a device including: an acquiring unit configured to acquire an offset or a threshold for an event regarding a measurement result of a neighbour cell; and a control unit configured to notify a terminal device of the offset or the threshold. The offset or the threshold includes an offset or a threshold for a first event regarding a measurement result of a neighbour cell in an on state and an offset or a threshold for a second event regarding a measurement result of a neighbour cell in an off state, and the offset or the threshold for the second event is different from the offset or the threshold for the first event.

In addition, according to the present disclosure, there is provided a device including: an acquiring unit configured to acquire information about traffic of a terminal device; and a control unit configured to perform measurement reporting when predetermined conditions of the information are satisfied.

In addition, according to the present disclosure, there is provided a device including an acquiring unit configured to acquire a measurement result of a cell in the off state and information about a buffer status of a terminal device, which are reported by the terminal device, and a control unit configured to decide to switch the cell to the on state based on the measurement result and the information.

Advantageous Effects of Invention

As described above, according to the present disclosure, it is possible to perform measurement reporting suitable for an environment in which an on/off state of a small cell is switched. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram for describing an example of a measurement gap.

DESCRIPTION OF EMBODIMENT(S)

Figure 1:
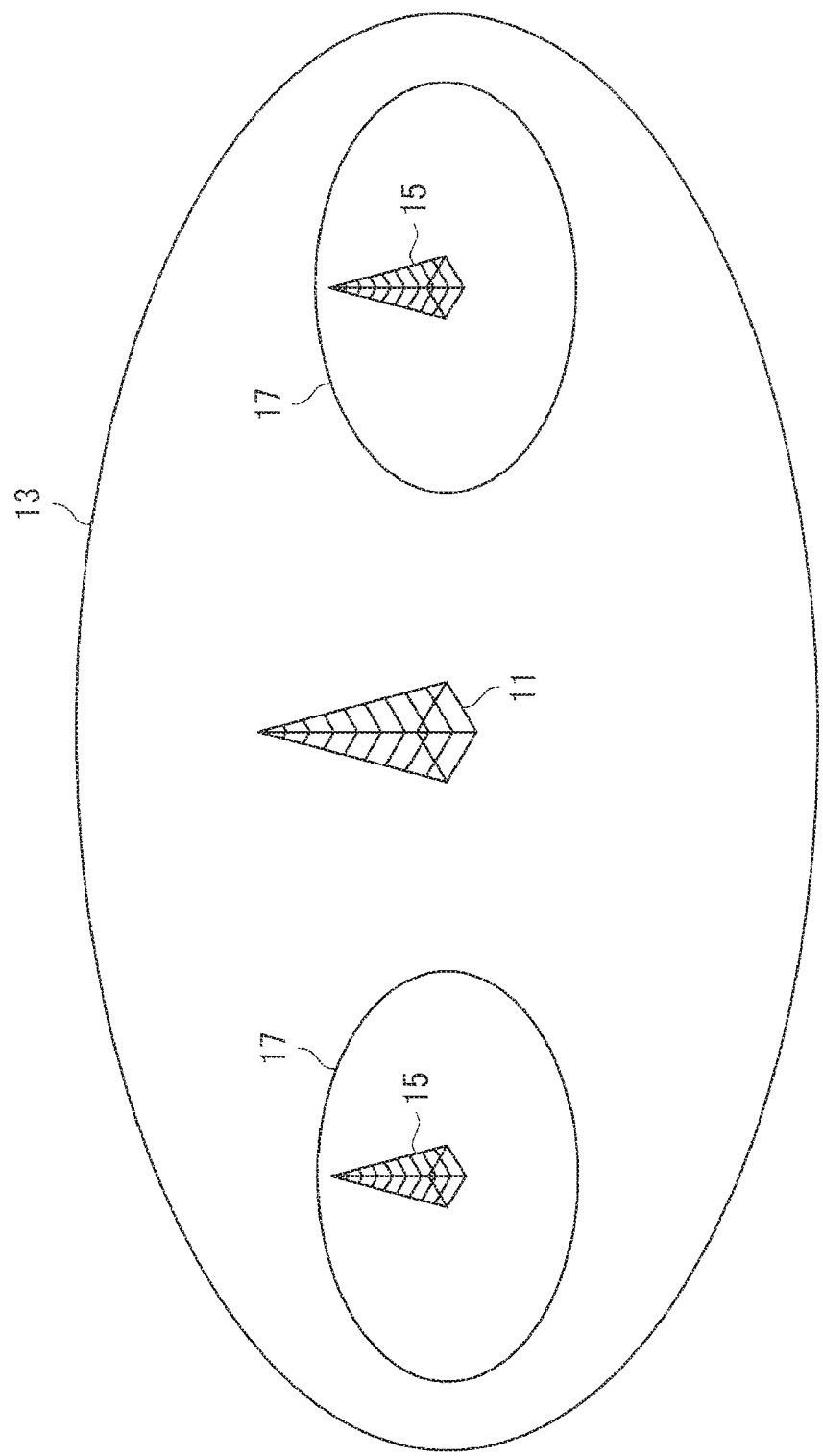
FIG. 1 is an explanatory diagram for describing an example of a small cell.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. Introduction
2. Schematic configuration of communication system
3. First Embodiment
3.1. Outline
3.2. Configuration of terminal device
3.3. Process flow
4. Second Embodiment
4.1. Outline
4.2. Configuration of terminal device
4.3. Configuration of base station
4.4. Process flow
5. Third Embodiment
5.1. Outline
5.2. Configuration of terminal device
5.3. Process flow
6. Fourth Embodiment
6.1. Outline
6.2. Configuration of control entity
6.3. Process flow
7. Fifth Embodiment
7.1. Outline
7.2. Configuration of base station
7.3. Process flow
8. Sixth Embodiment
8.1. Outline
8.2. Configuration of terminal device
8.3. Process flow
9. Seventh Embodiment
9.1. Outline
9.2. Configuration of terminal device
9.3. Configuration of base station
9.4. Process flow
10. Application examples
10.1. Application examples for control entity
10.2. Application examples for base station
10.3. Application examples for terminal device
11. Conclusion 1. Introduction A technology related to an embodiment of the present disclosure will be described with reference to FIG. 1 to FIG. 8. Specifically, a small cell, a measurement and carrier aggregation will be described.

(Small Cell)

(a) Small Cell

A small cell is a cell smaller than a macro cell. For example, the small cell partially or entirely overlaps the macro cell. Hereinafter, an example of the small cell will be described with reference to FIG. 1.

FIG. 1 is an explanatory diagram for describing an example of a small cell. Referring to FIG. 1, a macro base station 11, a macro cell 13, a small base station 15 and a small cell 17 are shown. The macro base station 11 is a base station of the macro cell 13. The small base station 15 is a base station of the small cell 17. In other words, the macro cell 13 is a coverage area of the macro base station 11 (that is, a communication area), and the small cell 17 is a coverage area of the small base station 15 (that is, a communication area).

A base station of LTE is referred to as an evolved node B (eNB). Here, a macro base station of LTE is referred to as a macro eNB, and a small base station of LTE is referred to as a small eNB. In addition, a terminal device of LTE is referred to as user equipment (UE).

(b) Small cell cluster

Small cells arranged at a high density form a small cell cluster. Hereinafter, an example of the small cell cluster will be described with reference to FIG. 2.

Figure 2:
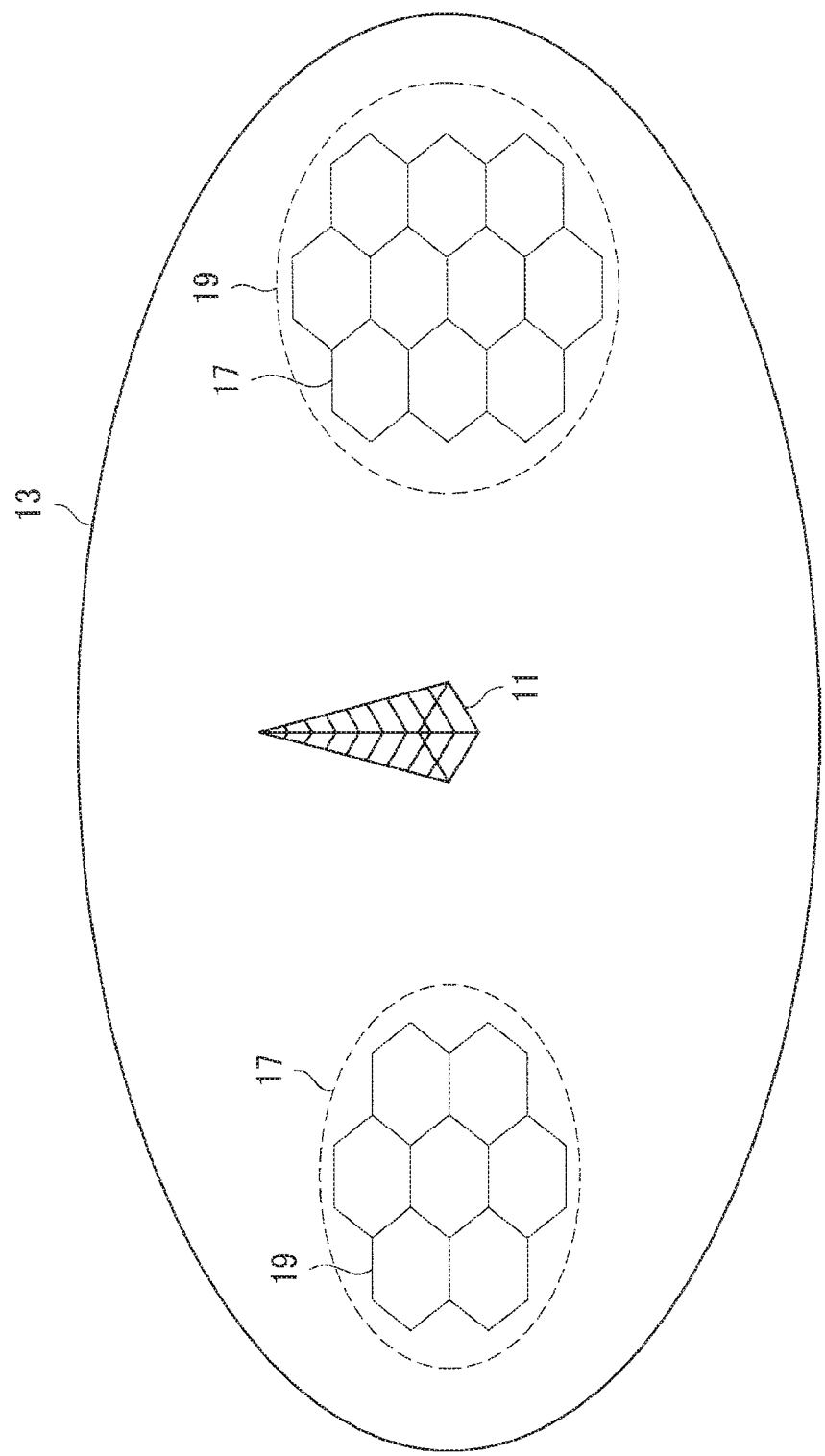
FIG. 2 is an explanatory diagram for describing an example of a small cell cluster.

FIG. 2 is an explanatory diagram for describing an example of a small cell cluster. Referring to FIG. 2, the macro base station 11, the macro cell 13 and the small cell 17 are shown. For example, small cells 17 arranged at a high density form a small cell cluster 19.

(c) Small Cell on/Off

In a case in which small cells are arranged at a high density, inter-cell interference causes a serious problem. In general, the small base station transmits a cell-specific reference signal (CRS) regardless of the presence or absence of traffic of the small cell. In the case in which small cells are arranged at a high density, it is known that a CRS causes large interference in a neighbour cell. Therefore, various technologies for reducing interference are being studied.

As a technology for reducing such inter-cell interference, a small cell on/off technology has currently been focused on. In the small cell on/off technology, an on/off state of a small cell is adaptively switched, and thus it is possible to suppress interference in a surrounding cell of the small cell. While a trigger for switching an on/off state of the small cell has not yet been specifically decided, a trigger for switching based on, for example, a traffic amount, association of a terminal device, or arrival of a packet is being studied. Hereinafter, an example of a small cell on/off procedure will be described with reference to FIG. 3.

Figure 3:
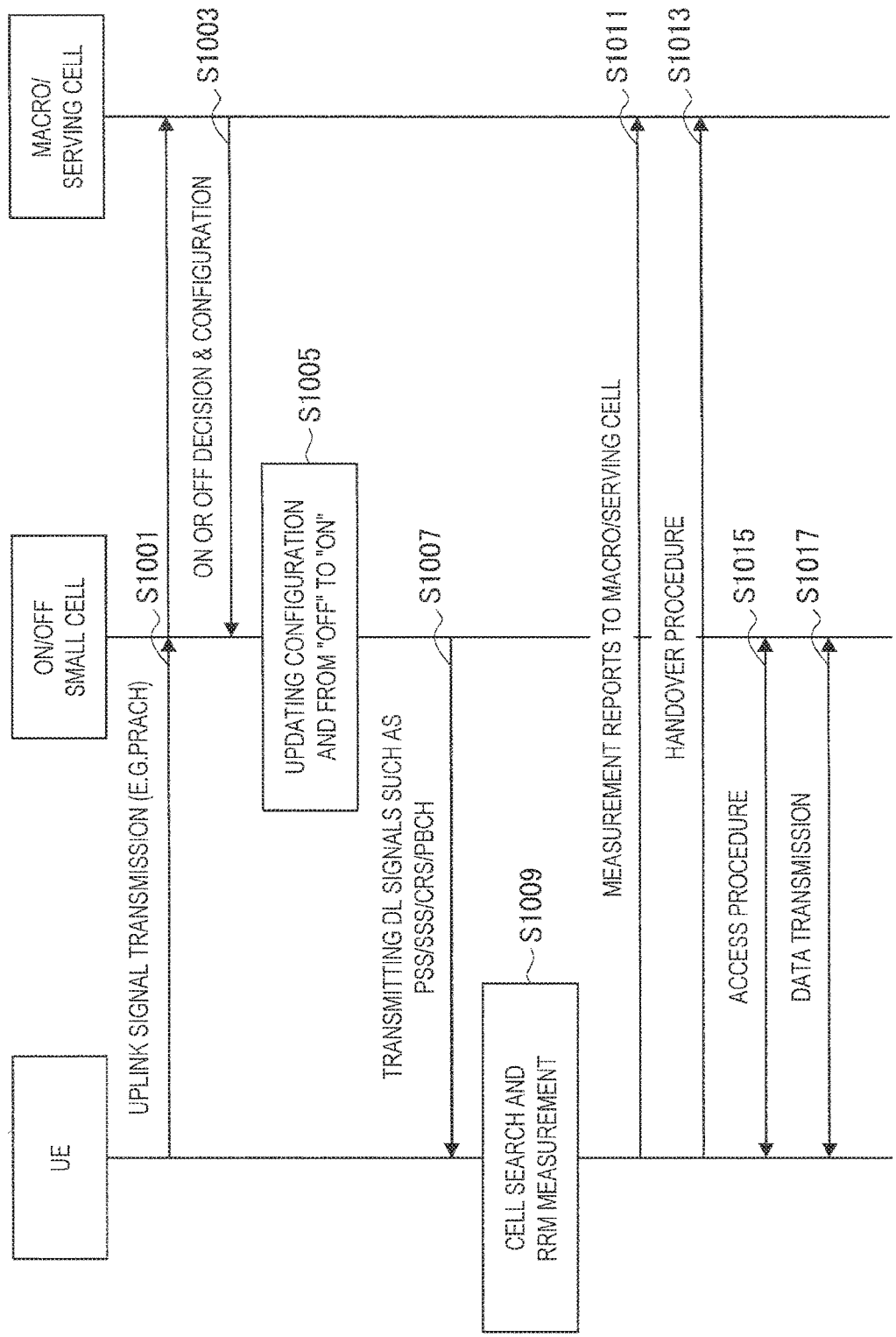
FIG. 3 is a sequence diagram illustrating an example of a schematic flow of an on/off process of a small cell.

FIG. 3 is a sequence diagram illustrating an example of a schematic flow of a small cell on/off process. The small cell on/off process is a process that is disclosed in R1-134318 of the Third Generation Partnership Project (3GPP). When data to be transmitted is generated, the UE transmits an uplink signal to a macro eNB of a macro cell that is a serving cell (S1001). Then, the macro eNB searches for a small eNB in an off state that is positioned around the UE, and instructs the appropriate small eNB to switch to an on state when there is an appropriate small eNB (S1003). Then, the small eNB performs switching from the off state to the on state (S1005). Then, the small eNB transmits downlink signals such as a primary synchronization signal (PSS), a secondary synchronization signal (SSS), a cell-specific reference signal (CRS) and a physical broadcast channel (PBCH) signal (S1007). In addition, the UE performs a cell search and RRM measurement (S1009), and performs measurement reporting to the macro eNB (S1011). Then, a handover of the UE from the macro cell to the small cell is performed (S1013). Then, the UE and the small eNB perform an access procedure (S1015) and perform data transmission (S1017).

According to the procedure shown in FIG. 3, it is possible to switch an on/off state of a small cell. However, according to the procedure, a transition time may become relatively longer. That is, according to the procedure, a time from when a terminal device attempts to transmit data until the terminal device actually transmits the data may become relatively longer. Therefore, large improvement of throughput is difficult. In order to improve the transition time, while the small cell is in the off state, a measurement process that serves as a main delay factor is preferably performed by the terminal device.

(d) Discovery Reference Signal

Introduction of a discovery reference signal (DRS) is being studied in order to reduce the transition time. The DRS enables measurement of a small cell in the off state. The DRS is also referred to as a discovery signal (DS). A small base station (for example, a small eNB) transmits a DRS while a small cell (or a small base station) is in the off state, and a terminal device (for example, UE) performs measurement based on a DRS. Hereinafter, an example of a small cell on/off procedure when a DRS is used will be described with reference to FIG. 4.

Figure 4:
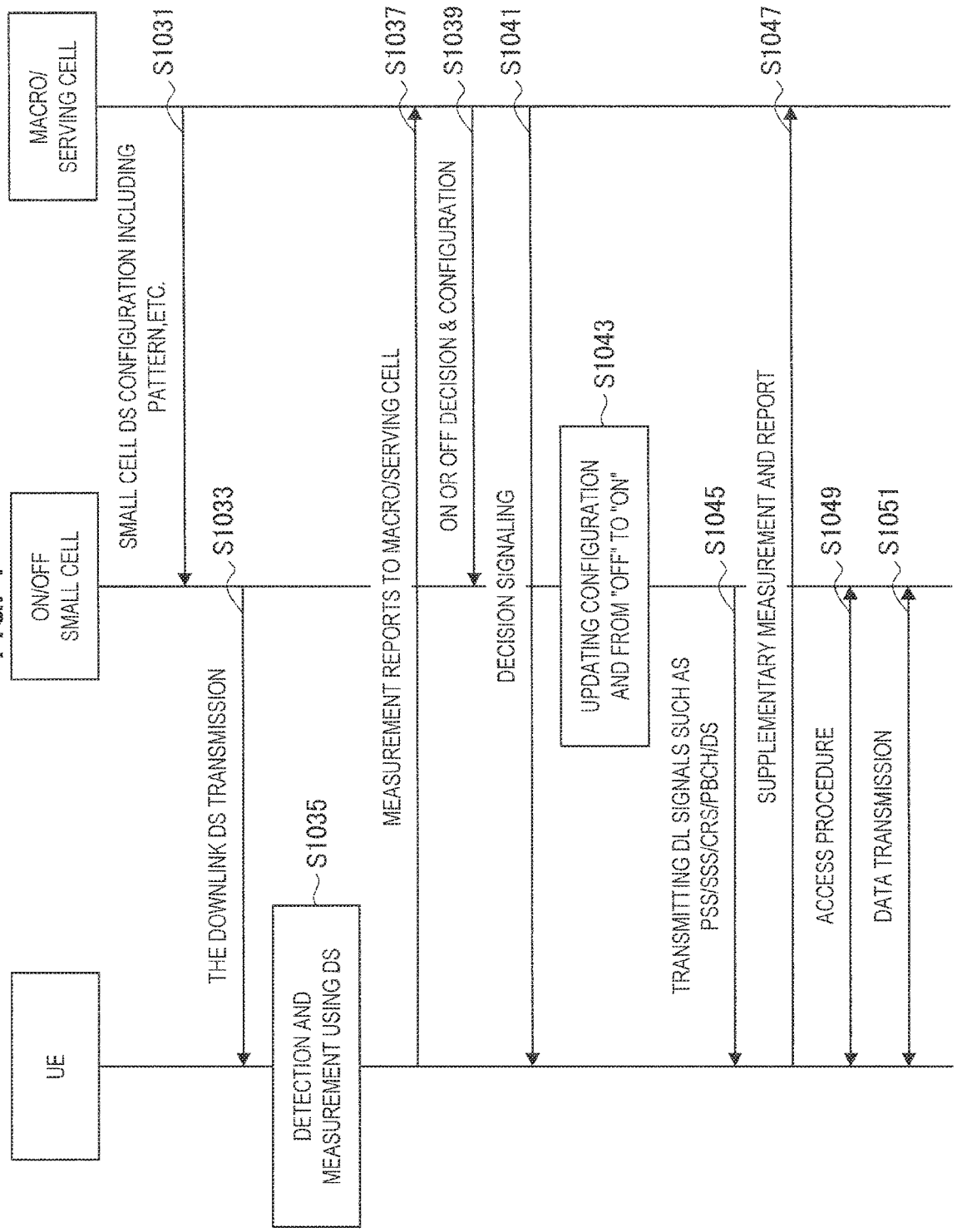
FIG. 4 is a sequence diagram illustrating an example of a schematic flow of an on/off process of a small cell when a DRS is used.

FIG. 4 is a sequence diagram illustrating an example of a schematic flow of a small cell on/off process when a DRS is used. The small cell on/off process is a process that is disclosed in R1-134318 of the 3GPP. A macro eNB instructs a small eNB to transmit a DS (S1031), and the small eNB transmits the DS in downlink (S1033). The UE performs measurement based on the DS (S1035) and reports a result of the measurement to the macro eNB (that is, an eNB of a macro cell that is a serving cell) (S1037). The UE and the small eNB perform data transmission through subsequent procedures (S1041 to S1049) (S1051).

According to the procedure shown in FIG. 4, while the small cell is in the off state, the terminal device can perform measurement. Therefore, the transition time is removed and throughput may be improved.

As various technologies for reducing interference, enhancement on a transmission side and a reception side such as muting, multiple instance and interference cancellation is also being studied.

(Measurement)

(a) CRS Measurement

In LTE, a terminal device performs measurement based on a CRS transmitted by a base station. Specifically, the terminal device receives a CRS transmitted by a base station and thus performs measurement of quality of a propagation path between the base station and the terminal device. The measurement is referred to as "radio resource management (RRM) measurement," or is simply referred to as "measurement."

A result of the measurement is used to select a cell for a terminal device. As a specific example, the result of the measurement is used for cell selection/cell reselection by a terminal device that is in a radio resource control (RRC) idle (RRC Idle) state. In addition, for example, the result of the measurement is reported to a base station by a terminal device that is in an RRC connected state and is used for a handover decision by the base station.

(b) RSRP and RSRQ

In LTE, CRS measurement is measurement of reference signal received power (RSRP) and/or reference signal received quality (RSRQ). In other words, a terminal device acquires RSRP and/or RSRQ as a result of the measurement of the CRS. The RSRQ is calculated from the RSRP and a received signal strength indicator (RSSI).

The RSRP is reception power of a CRS for each single resource element. That is, the RSRP is an average value of reception power of the CRS. The reception power of the CRS is obtained by detecting a correlation between a reception signal in a resource element of the CRS and a known signal CRS. The RSRP corresponds to a desired signal "Signal (S)."

The RSSI is total power of signals for each Orthogonal Frequency Division Multiple Access (OFDMA) symbol. Therefore, the RSSI includes a desired signal, an interference signal and noise. That is, the RSSI corresponds to "Signal (S)+Interference (I)+Noise (N)."

The RSRQ is RSRP/(RSRI/N). N denotes the number of resource blocks used for calculating an RSSI. The resource blocks are resource blocks that are arranged in a frequency direction. Therefore, the RSRQ is a value that is obtained by dividing the RSRP using the RSRI for each resource block. That is, the RSRQ corresponds to a signal-to-interference-plus-noise ratio (SINR).

As described above, according to the measurement of the CRS, reception power (that is, RSRP) and reception quality (that is, RSRQ) such as an SINR are obtained.

(c) Measurement Timing

Measurement of a frequency band that a terminal device uses is referred to as intra-frequency measurement. Conversely, measurement of a frequency band that a terminal device does not use is referred to as inter-frequency measurement.

The terminal device can receive a CRS transmitted in a frequency band that is used without switching a frequency of a radio frequency (RF) circuit. That is, it is unnecessary to switch a frequency of the RF circuit for intra-frequency measurement.

Conversely, in order for the terminal device to receive a CRS transmitted in a frequency band that is not used, it is necessary to switch a frequency of a radio frequency (RF) circuit. That is, it is necessary to switch a frequency of the RF circuit for inter-frequency measurement. Therefore, a period called a measurement gap is used for inter-frequency measurement.

During the measurement gap, the base station does not transmit a downlink signal addressed to a terminal device. In addition, the measurement gap is shared between the base station and the terminal device. For example, the base station transmits a message (for example, an RRC connection reconfiguration message) including information indicating a measurement gap to the terminal device. For example, the measurement gap is indicated by a measurement gap length (MGL), a measurement gap repetition period (MGRP) and a gap offset. In addition, a combination of the MGL and the MGRP is determined as, for example, a gap pattern. Hereinafter, an example of the measurement gap will be described with reference to FIG. 5.

FIG. 5 is an explanatory diagram for describing an example of a measurement gap. FIG. 5 shows a matrix including columns of radio frames whose SFNs are 0 to 9 and rows of 10 subframes (subframes whose subframe numbers are 0 to 9) included in radio frames. In this example, the MGL is 6 milliseconds (ms), the MGRP is 40 ms, and the gap offset is 0. Therefore, the measurement gap has a length of 6 ms and appears every 40 ms. More specifically, for example, six subframes whose subframe numbers are 0 to 5 among radio frames whose SFNs are 0, 4 and 8 are the measurement gap. Inter-frequency measurement is performed during the measurement gap.

(d) Measurement reporting

The terminal device reports a measurement result to the base station. The reporting is referred to as measurement reporting.

The measurement reporting is periodic reporting or event-triggered reporting. The periodic reporting is reporting that is performed at set periods. Conversely, the event-triggered reporting is reporting that is performed when a reporting event is generated. Reporting events A1 to A5 are events associated with a handover within a system, and reporting events B1 to B2 are events associated with a handover between systems.

TABLE 1

| Event Type | Description |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

(Carrier Aggregation)

Carrier aggregation (CA) is a technology through which communication is performed using a plurality of component carriers (CCs) at the same time. The component carrier is a frequency band having a maximum of a 20 MHz bandwidth. The carrier aggregation includes three scenarios. Hereinafter, three scenarios of the carrier aggregation will be described with reference to FIG. 6 to FIG. 8.

Figure 6:
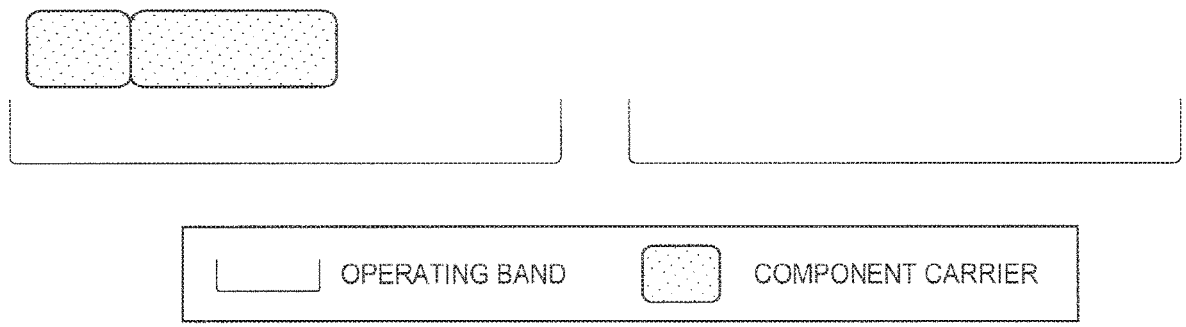
FIG. 6 is an explanatory diagram for describing a first scenario of carrier aggregation (CA).
Figure 7:
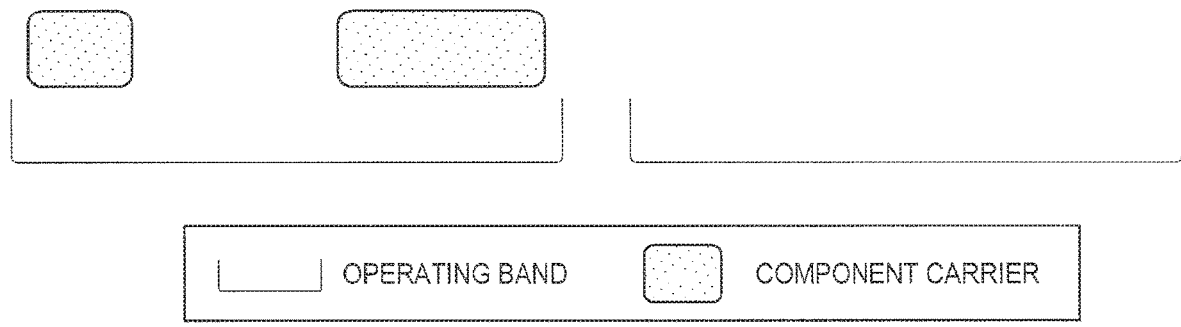
FIG. 7 is an explanatory diagram for describing a second scenario of carrier aggregation (CA).
Figure 8:
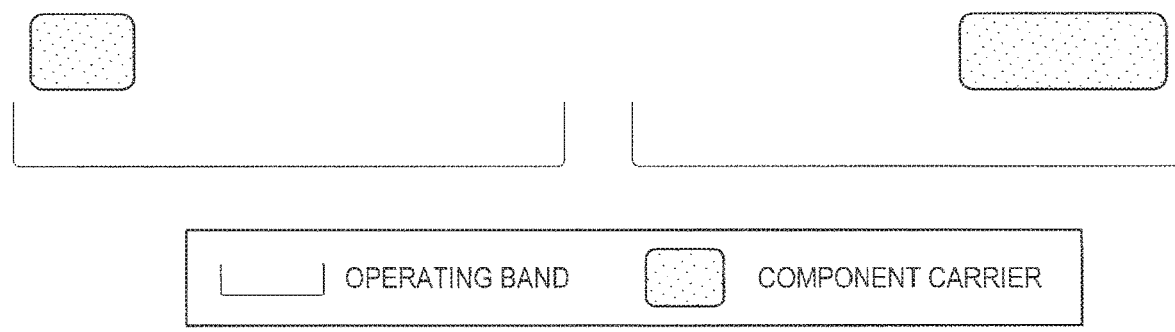
FIG. 8 is an explanatory diagram for describing a third scenario of carrier aggregation (CA).

FIG. 6 to FIG. 8 are explanatory diagrams for describing first to third scenarios of carrier aggregation (CA). As illustrated in FIG. 6, in the first scenario (intra-band contiguous) of CA, the terminal device uses CCs adjacent in the same operating. As illustrated in FIG. 7, in the second scenario (intra-band non-contiguous) of CA, the terminal device uses CCs that are not adjacent in the same operating. As illustrated in FIG. 8, in the third scenario (inter-band non-contiguous) of CA, the terminal device uses CCs that are not adjacent in different operating.

2. Schematic Configuration of Communication System

Figure 9:
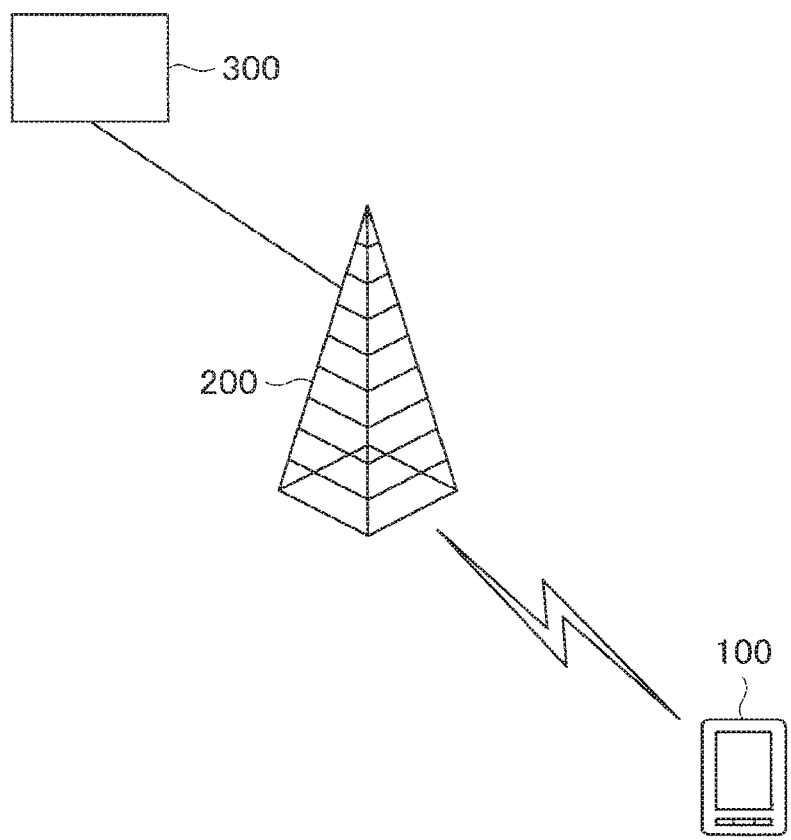
FIG. 9 is an explanatory diagram illustrating an example of a schematic configuration of a communication system according to an embodiment of the present disclosure.

Next, a schematic configuration of a communication system 1 according to an embodiment of the present disclosure will be described with reference to FIG. 9. FIG. 9 is an explanatory diagram illustrating an example of a schematic configuration of the communication system 1 according to an embodiment of the present disclosure. As illustrated in FIG. 9, the communication system 1 includes a terminal device 100, a base station 200 and a control entity 300. The communication system 1 is a system supporting, for example, LTE, LTE-Advanced or a communication standard equivalent thereto.

The terminal device 100 wirelessly communicates with the base station 200. In addition, the terminal device 100 performs measurement of a cell (for example, a serving cell and a neighbour cell). In addition, the terminal device 100 performs measurement reporting (that is, reporting of a measurement result) to the base station 200.

The base station 200 wirelessly communicates with one or more terminal devices including the terminal device 100. In addition, the base station 200 decides a handover of a terminal device based on the measurement result reported by the terminal device. The base station 200 may be a base station of a macro cell (that is, a macro base station) or a base station of a small cell (that is, a small base station).

The control entity 300 performs control according to each embodiment of the present disclosure. The control entity 300 is, for example, an existing or new core network node. Alternatively, the control entity 300 may be a base station. As an example, when the base station 200 is a small base station, the control entity 300 may be a macro base station.

In embodiments of the present disclosure, for example, an "on state" of a cell (for example, a small cell) is a state in which a base station of the cell transmits and receives signals (a data signal and a control signal) in the cell. Conversely, for example, an "off state" of a cell (for example, a small cell) is a state in which a base station of the cell does not transmit and receive signals except some control signals (for example, a DRS) in the cell. Alternatively, the "off state" of a cell may be a state in which a base station of the cell does not transmit and receive signals in the cell at all.

3. First Embodiment

Figure 10:
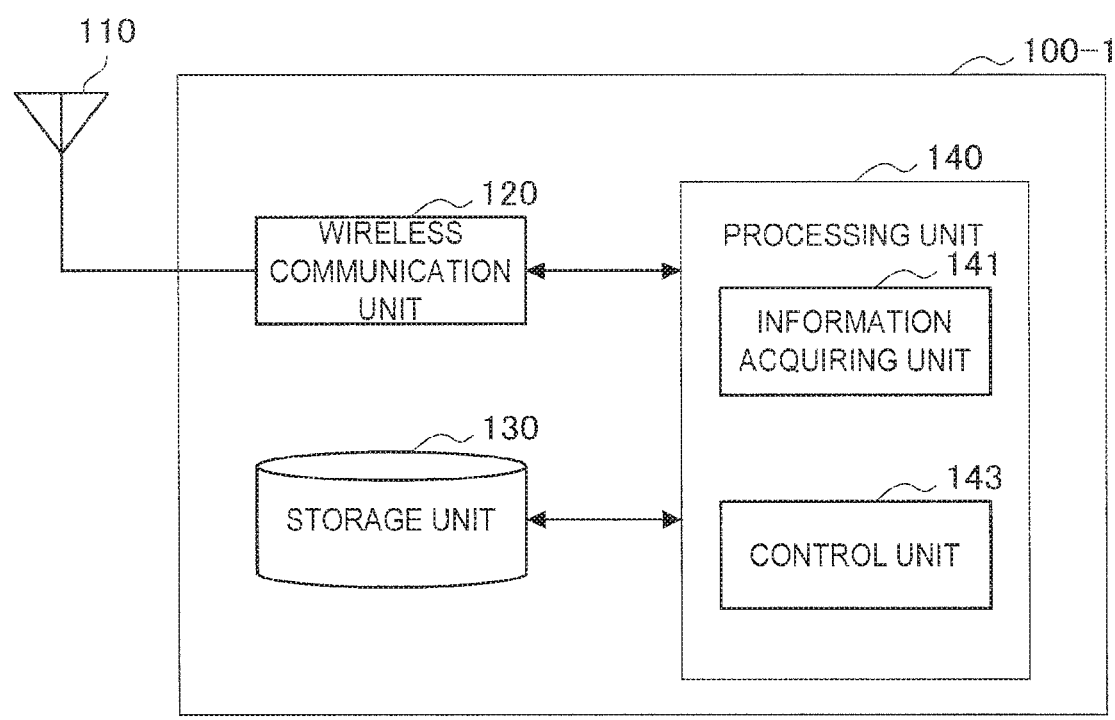
FIG. 10 is a block diagram illustrating an example of a configuration of a terminal device according to a first embodiment.
Figure 11:
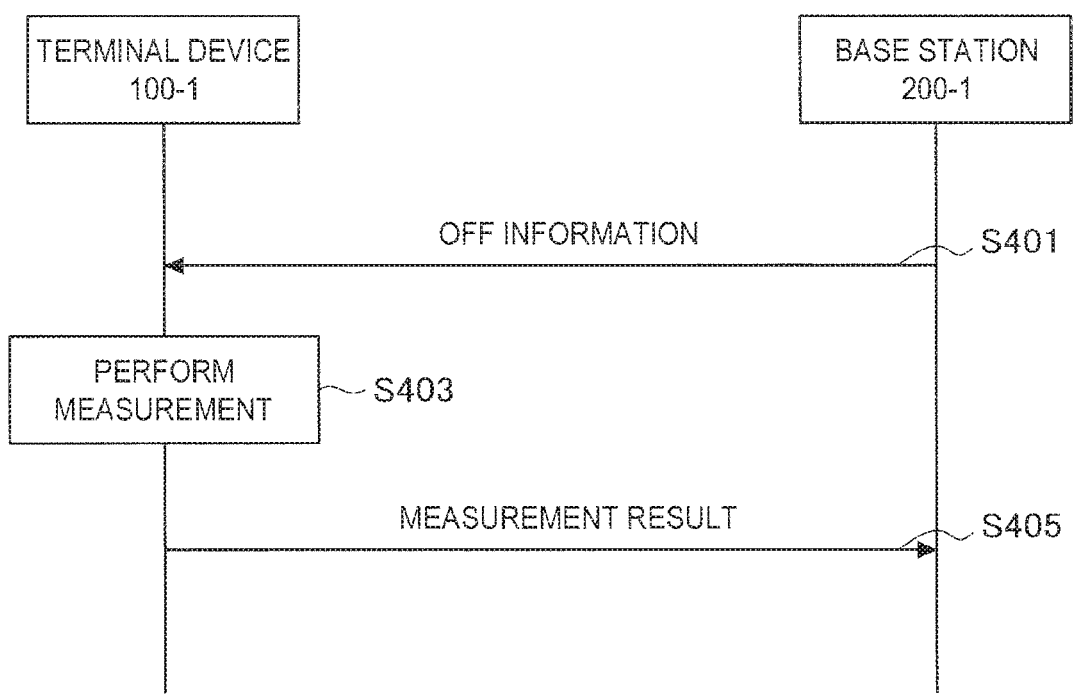
FIG. 11 is a sequence diagram illustrating an example of a schematic flow of a process according to the first embodiment.

Next, a first embodiment of the present disclosure will be described with reference to FIG. 10 and FIG. 11.

<3.1. Outline>

Generally, a base station decides a handover of a terminal device based on a measurement result reported by the terminal device. In addition, the terminal device reports the measurement result to the base station periodically or according to a generation of an event.

In an environment in which an on/off state of a cell (for example, a small cell) is switched, a serving cell of the terminal device may is in the off state from the on state. In this case, it is preferable that a handover of the terminal device be performed before the cell is in the off state. However, for example, there is a possibility of a measurement result not being reported to a base station before a cell is in the off state according only to an existing event. As a result, a better cell as a handover destination of the terminal device is considered not to be selected.

Thus, it is preferable to provide a mechanism through which it is possible to perform measurement reporting suitable for an environment in which the on/off state of a cell is switched.

In the first embodiment, a terminal device 100-1 performs measurement reporting before a serving cell is in the off state. Accordingly, for example, it is possible to perform measurement reporting suitable for an environment in which the on/off state of a cell is switched. More specifically, for example, measurement reporting useful for selecting a new serving cell is performed.

<3.2. Configuration of Terminal Device>

Next, an example of a configuration of the terminal device 100-1 according to the first embodiment will be described with reference to FIG. 10. FIG. 10 is a block diagram illustrating an example of a configuration of the terminal device 100-1 according to the first embodiment. As illustrated in FIG. 10, the terminal device 100-1 includes an antenna unit 110, a wireless communication unit 120, a storage unit 130 and a processing unit 140.

(Antenna Unit 110)

The antenna unit 110 emits a signal output by the wireless communication unit 120 into space as radio waves. In addition, the antenna unit 110 converts spatial radio waves into a signal and outputs the signal to the wireless communication unit 120.

(Wireless Communication Unit 120)

The wireless communication unit 120 transmits and receives signals. For example, the wireless communication unit 120 receives a downlink signal from a base station and transmits an uplink signal to the base station.

(Storage Unit 130)

The storage unit 130 temporarily or permanently stores programs and data for operations of the terminal device 100-1.

(Processing Unit 140)

The processing unit 140 provides various functions of the terminal device 100-1. The processing unit 140 includes an information acquiring unit 141 and a control unit 143. Alternatively, the processing unit 140 may further include a component other than these components. That is, the processing unit 140 may also perform an operation other than operations of these components.

(Information Acquiring Unit 141)

The information acquiring unit 141 acquires information indicating that a serving cell is scheduled to be in the off state (hereinafter referred to as "off information"). The serving cell is a serving cell of the terminal device 100-1.

(a) Serving Cell

For example, the serving cell is a primary cell (a Pcell) of carrier aggregation. The primary cell is referred to as a primary component carrier (a PCC). The off state of the primary cell means that the PCC is deactivated.

For example, the serving cell is a small cell. In this case, a base station 200-1 is a small base station.

In view of the above point, for example, the information acquiring unit 141 acquires information indicating that a small cell (a cell of the base station 200-1) serving as a primary cell is scheduled to be in the off state.

(b) Specific Process

For example, the base station 200-1 transmits off information indicating that a cell of the base station 200-1 is scheduled to be in the off state to the terminal device 100-1, and the terminal device 100-1 receives the off information. Then, the off information is stored in the storage unit 130. Then, the information acquiring unit 141 acquires the off information from the storage unit 130.

(Control Unit 143)

The control unit 143 performs measurement reporting before a serving cell is in the off state. For example, the control unit 143 performs measurement reporting according to the acquisition of the off information. The serving cell is a serving cell of the terminal device 100.

(a) Event

For example, the control unit 143 performs measurement reporting according to a generation of an event indicating that a serving cell is scheduled to be in the off state. That is, the measurement reporting is event-triggered reporting that is triggered by a new event (or a new event equivalent thereto) defined, for example, as follows.

TABLE 2

| Event Type | Description |
| --- | --- |
| New Event | Serving cell indicate to the UE that serving cell will be in off state |

(b) Measurement Reporting (b-1) Target Cell

For example, the measurement reporting is measurement reporting of a cell other than the serving cell. That is, the terminal device 100-1 performs measurement reporting of the cell other than the serving cell before the serving cell is in the off state.

For example, the cell other than the serving cell includes a neighbour cell. Further, as described above, when the serving cell is a primary cell of carrier aggregation, the cell other than the serving cell may include a secondary cell of carrier aggregation instead of the neighbour cell or may be included with the neighbour cell.

Accordingly, for example, the base station 200-1 can select an appropriate handover destination of the terminal device 100-1.

As an example, the cell other than the serving cell is a cell associated with the most favorable measurement result. Accordingly, for example, it is possible to select an optimal handover while reducing overhead.

(b-2) Measurement

The measurement reporting is reporting of a result of measurement performed by the terminal device 100-1. The measurement is RRM measurement, for example, measurement of reception power or reception quality. More specifically, for example, the measurement is measurement of RSRP or RSRQ.

Alternatively, the measurement (for example, measurement of a serving cell and a neighbour cell) may be performed by the control unit 143 or may be performed by another component included in the processing unit 140.

<3.3. Process Flow>

Next, an example of a process according to the first embodiment will be described with reference to FIG. 11. FIG. 11 is a sequence diagram illustrating an example of a schematic flow of a process according to the first embodiment.

The base station 200-1 transmits information indicating that a serving cell (for example, a primary cell) is scheduled to be in the off state (that is, off information) to the terminal device 100-1 (S401). The terminal device 100-1 (the information acquiring unit 141) acquires the off information.

The terminal device 100-1 (the control unit 143) performs measurement of a cell other than the serving cell (for example, the primary cell) (S403).

The terminal device 100-1 (the control unit 143) performs measurement reporting of a cell other than the serving cell (S405). That is, the terminal device 100-1 reports a measurement result of a cell other than the serving cell to the base station 200-1.

Instead of performing measurement (S403) after the off information is acquired (S401), the terminal device 100-1 may use a result of measurement performed before the off information is acquired.

4. Second Embodiment

Figure 12:
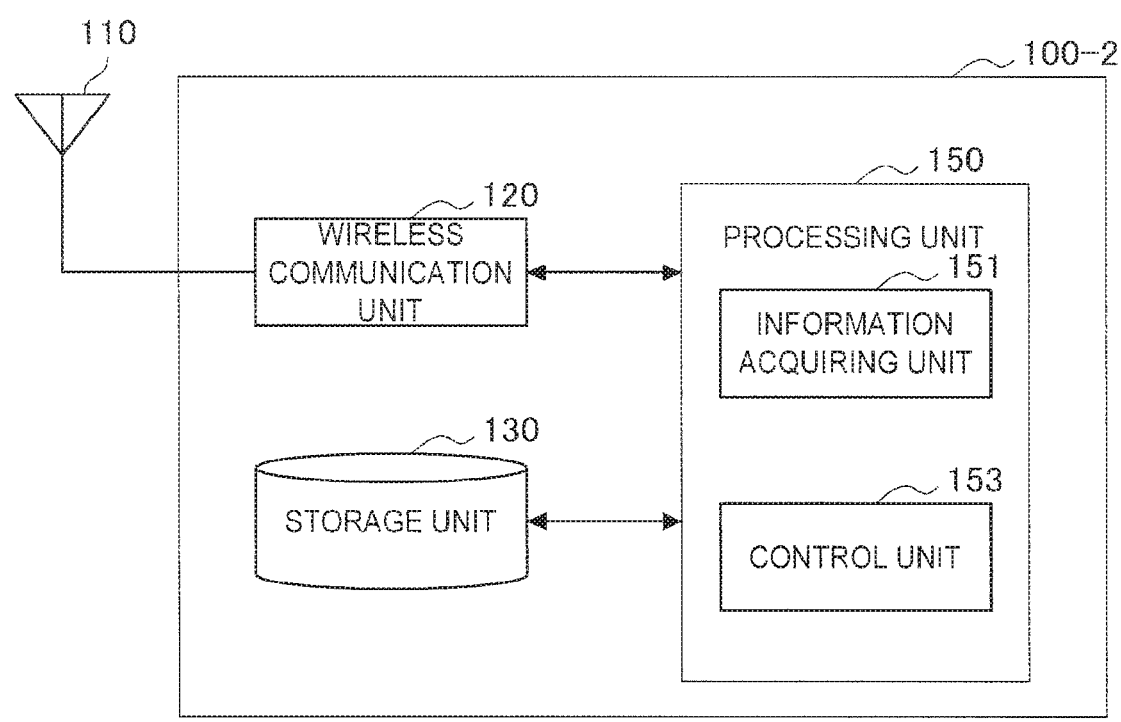
FIG. 12 is a block diagram illustrating an example of a configuration of a terminal device according to a second embodiment.
Figure 13:
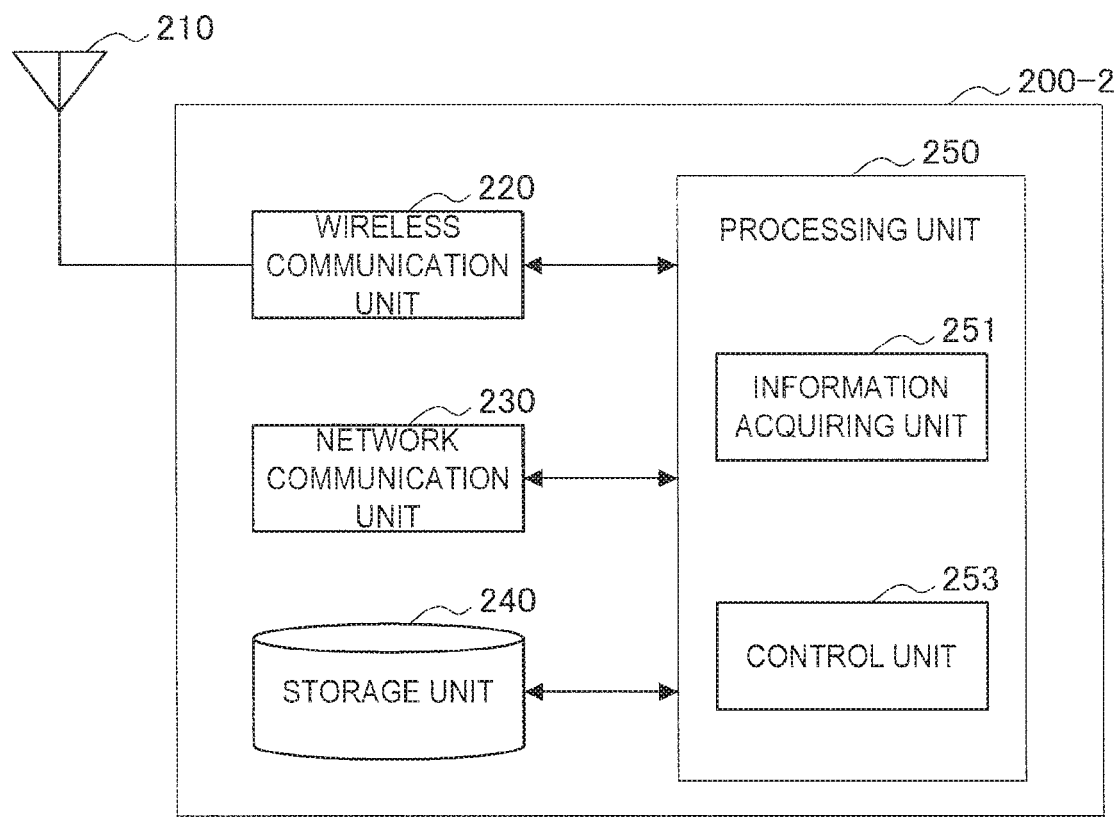
FIG. 13 is a block diagram illustrating an example of a configuration of a base station according to the second embodiment.
Figure 14:
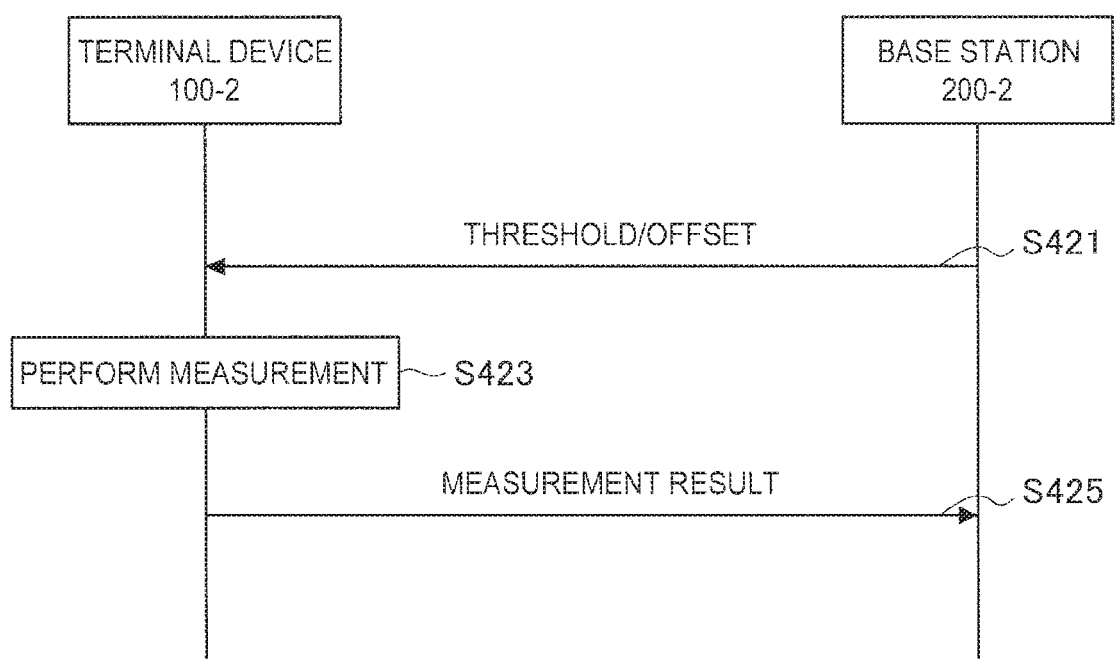
FIG. 14 is a sequence diagram illustrating an example of a schematic flow of a process according to the second embodiment.

Next, a second embodiment of the present disclosure will be described with reference to FIG. 12 to FIG. 14.

<4.1. Outline>

Generally, a base station decides a handover of a terminal device based on a measurement result reported by the terminal device. In addition, the terminal device reports the measurement result to the base station periodically or according to a generation of an event.

In an environment in which the on/off state of a cell (for example, a small cell) is switched, in order to continue the off state of a cell as long as possible, it is more preferable that a handover destination of the terminal device be a cell in the on state rather than a cell in the off state. However, in an existing event, measurement reporting may be performed regardless of the on/off state of a mall cell. As a result, for example, there is a possibility of a handover to a cell in the off state being frequently performed. Alternatively, even when strict conditions of a handover to a cell in the off state are set and the handover is suppressed, measurement reporting of a cell in the off state is frequently performed and overhead may increase as a result.

Thus, it is preferable to provide a mechanism through which it is possible to perform measurement reporting suitable for an environment in which the on/off state of a cell is switched.

In the second embodiment, a terminal device 100-2 performs measurement reporting according to a generation of a first event regarding a measurement result of a neighbour cell in the on state. In addition, the terminal device 100-2 performs measurement reporting according to a generation of a second event regarding a measurement result of a neighbour cell in the off state. The first event and the second event have different offsets or thresholds. Accordingly, for example, it is possible to perform measurement reporting suitable for an environment in which the on/off state of a cell is switched. More specifically, for example, measurement reporting of a cell in the off state is suppressed <4.2. Configuration of Terminal Device>

Next, an example of a configuration of the terminal device 100-2 according to the second embodiment will be described with reference to FIG. 12. FIG. 12 is a block diagram illustrating an example of a configuration of the terminal device 100-2 according to the second embodiment. As illustrated in FIG. 12, the terminal device 100-2 includes the antenna unit 110, the wireless communication unit 120, the storage unit 130 and a processing unit 150.

There is no difference in descriptions of the antenna unit 110, the wireless communication unit 120 and the storage unit 130 between the first embodiment and the second embodiment except for different reference numerals. Therefore, redundant descriptions will be omitted here, and only the processing unit 150 will be described.

(Processing Unit 150)

The processing unit 150 provides various functions of the terminal device 100-2. The processing unit 150 includes an information acquiring unit 151 and a control unit 153. The processing unit 150 may further include a component other than these components. That is, the processing unit 150 may also perform an operation other than operations of these components.

(Information Acquiring Unit 151)

The information acquiring unit 151 acquires an offset or a threshold for an event regarding a measurement result of a neighbour cell.

(a) Offset or Threshold

The offset or the threshold includes an offset or a threshold for a first event regarding a measurement result of a neighbour cell in the on state and an offset or a threshold for a second event regarding a measurement result of a neighbour cell in the off state. The offset or the threshold for the second event is different from the offset or the threshold for the first event.

(b) Specific Process

For example, a base station 200-2 notifies the terminal device 100-2 of the offset or the threshold. For example, the base station 200-2 notifies the terminal device 100-2 of the offset or the threshold through system information (for example, a system information block (SIB)) or through individual signaling (for example, RRC signaling). Then, the offset or the threshold is stored in the storage unit 130. The information acquiring unit 151 acquires the offset or the threshold at any time thereafter.

(Control Unit 153)

The control unit 153 performs measurement reporting according to a generation of a first event regarding a measurement result of a neighbour cell in the on state. In addition, the control unit 153 performs measurement reporting according to a generation of a second event regarding a measurement result of a neighbour cell in the off state. The first event and the second event have different offsets or thresholds.

For example, the second event has stricter generation conditions than the first event.

(a) First Event and Second Event (a-1) First Example

As a first example, a neighbour cell in the on state becomes better than a serving cell by a first offset in a measurement result in the first event, and a neighbour cell in the off state becomes better than a serving cell by a second offset in a measurement result in the second event. The second offset is greater than the first offset.

For example, the first event is an existing event A3, and the second event is a new event (or a new event equivalent thereto) associated with a greater offset than the existing event A3 as follows.

TABLE 3

| Event Type | Description |
|---|---|
| New Event | Neighbour off cell becomes better than the serving cell by an offset |

In addition, for example, the serving cell is a primary cell of carrier aggregation. In this case, the second event is a new event as follows

TABLE 4

| Event Type | Description |
|---|---|
| New Event | Neighbour off cell becomes better than the primary cell by an offset |

Alternatively, the second event may be the existing event A3 rather than the new event. In this case, an offset according to a state (the on state or the off state) of a neighbour cell may be applied to the existing event A3.

According to such a first example, for example, measurement reporting of a neighbour cell in the off state is suppressed, when compared to a neighbour cell in the on state.

(a-2) Second Example

As a second example, a neighbour cell in the on state becomes better than a first threshold in a measurement result in the first event, and a neighbour cell in the off state becomes better than a second threshold in a measurement result in the second event. The second threshold is greater than the first threshold.

For example, the first event is an existing event A4, and the second event is a new event (or a new event equivalent thereto) associated with a greater threshold than the existing event A4 as follows.

TABLE 5

| Event Type | Description |
|---|---|
| New Event | Neighbour off cell becomes better than a threshold |

Alternatively, the second event may be the existing event A4 rather than the new event. In this case, a threshold according to a state (the on state or the off state) of a neighbour cell may be applied to the existing event A4.

According to such a second example, for example, measurement reporting of a neighbour cell in the off state is suppressed, when compared to a neighbour cell in the on state.

(a-3) Third Example

As a third example, a serving cell becomes worse than a first threshold and a neighbour cell in the on state becomes better than a second threshold in a measurement result in the first event, and a serving cell becomes worse than a third threshold and a neighbour cell in the off state becomes better than a fourth threshold in a measurement result in the second event. The fourth threshold is greater than the second threshold or the third threshold is smaller than the first threshold.

For example, the first event is an existing event A5, and the second event is a new event (or a new event equivalent thereto) associated with a threshold different from the existing event A5 as follows.

TABLE 6

| Event Type | Description |
|---|---|
| New Event | Serving cell becomes worse than threshold 1 while neighbour off cell becomes better than threshold 2 |

In the new event, a threshold (threshold 2) of a neighbour cell in the off state is greater and/or a threshold (threshold 1) of a serving cell is smaller when compared to the existing event A5.

In addition, for example, the serving cell is a primary cell of carrier aggregation. In this case, the second event is a new event as follows

TABLE 7

| Event Type | Description |
|---|---|
| New Event | Primary Cell becomes worse than threshold 1 while neighbour off cell becomes better than threshold 2 |

Alternatively, the second event may be the existing event A5 rather than the new event. In this case, a threshold according to a state (the on state or the off state) of a neighbour cell may be applied to the existing event A5.

According to such a third example, for example, measurement reporting of a neighbour cell in the off state is suppressed, when compared to a neighbour cell in the on state.

(a-4) Fourth Example

As a fourth example, a neighbour cell in the on state becomes better than a secondary cell by a first offset in a measurement result in the first event, and a neighbour cell in the off state becomes better than a secondary cell by a second offset in a measurement result in the second event. The second offset is greater than the first offset.

For example, the first event is an existing event A6, and the second event is a new event (or a new event equivalent thereto) associated with a greater offset than the existing event A6 as follows.

TABLE 8

| Event Type | Description |
|---|---|
| New Event | Neighbour off cell becomes better than secondary cell by an offset |

Alternatively, the second event may be the existing event A6 rather than the new event. In this case, an offset according to a state (the on state or the off state) of a neighbour cell may be applied to the existing event A6.

According to such a first example, for example, measurement reporting of a neighbour cell in the off state is suppressed, when compared to a neighbour cell in the on state.

(b) Measurement

The measurement reporting is reporting of a result of measurement performed by the terminal device 100-2. The measurement is RRM measurement, for example, measurement of reception power or reception quality. More specifically, for example, the measurement is measurement of RSRP or RSRQ.

The measurement is performed based on a reference signal. The reference signal is, for example, a CRS that is transmitted in a cell in the on state and/or a DRS that is transmitted in a cell in the off state (and a cell in the on state).

Alternatively, the measurement (for example, measurement of a serving cell and a neighbour cell) may be performed by the control unit 153 or may be performed by another component included in the processing unit 150.

<4.3. Configuration of Base Station>

Next, an example of a configuration of the base station 200-2 according to the second embodiment will be described with reference to FIG. 13. FIG. 13 is a block diagram illustrating an example of a configuration of the base station 200-2 according to the second embodiment. Referring to FIG. 13, the base station 200-2 includes an antenna unit 210, a wireless communication unit 220, a network communication unit 230, a storage unit 240, and a processing unit 250.

(Antenna Unit 210)

The antenna unit 210 radiates a signal output from the wireless communication unit 220 into the air as radio waves. The antenna unit 210 converts the radio waves in the air into a signal, and outputs the signal to the wireless communication unit 220.

(Wireless Communication Unit 220)

The wireless communication unit 220 transmits or receives a signal. For example, the wireless communication unit 220 transmits the downlink signal to the terminal device, and receives the uplink signal from the terminal device.

(Network Communication Unit 230)

The network communication unit 230 transmits and receives information. For example, the network communication unit 230 transmits information to another node and receives information from another node. For example, the other node includes a core network and another base station. As an example, the other node includes a control entity 300-2.

(Storage Unit 240)

The storage unit 240 temporarily or permanently stores a program and data for an operation of the base station 200-2.

(Processing Unit 250)

The processing unit 250 provides various functions of the base station 200-2. The processing unit 250 includes an information acquiring unit 251 and a control unit 253. The processing unit 250 may further include any other component in addition to the above-mentioned components. In other words, the processing unit 250 may also perform an operation other than operations of the above-mentioned components.

(Information Acquiring Unit 251)

The information acquiring unit 251 acquires an offset or a threshold for an event regarding a measurement result of a neighbour cell.

(a) Offset or Threshold

The offset or the threshold includes an offset or a threshold for a first event regarding a measurement result of a neighbour cell in the on state and an offset or a threshold for a second event regarding a measurement result of a neighbour cell in the off state. The offset or the threshold for the second event is different from the offset or the threshold for the first event.

(b) Specific Process

For example, the offset or the threshold is stored in the storage unit 240, and the information acquiring unit 251 acquires the offset or the threshold from the storage unit 240.

(Control Unit 253)

The control unit 253 notifies the terminal device 100-2 of the offset or the threshold for the event.

For example, the control unit 253 notifies the terminal device 100-2 of the offset or the threshold through system information (for example, an SIB) or through individual signaling (for example, RRC signaling).

<4.4. Process Flow>

Next, an example of a process according to the second embodiment will be described with reference to FIG. 14. FIG. 14 is a sequence diagram illustrating an example of a schematic flow of a process according to the second embodiment.

The base station 200-2 (the control unit 253) notifies the terminal device 100-2 of an offset and/or a threshold for an event regarding a measurement result of a neighbour cell (S421). The terminal device 100-2 (the information acquiring unit 151) acquires the offset and/or the threshold.

The terminal device 100-2 (the processing unit 250) performs measurement of a cell (S423). The cell includes a serving cell and an adjacent cell.

The terminal device 100-2 (the control unit 153) performs measurement reporting according to a generation of an event (S425). That is, the terminal device 100-2 reports a measurement result of a cell to the base station 200-2. For example, the terminal device 100-2 (the control unit 153) performs measurement reporting according to a generation of a first event regarding a measurement result of a neighbour cell in the on state. In addition, the terminal device 100-2 (the control unit 153) performs measurement reporting according to a generation of a second event regarding a measurement result of a neighbour cell in the off state. The first event and the second event have different offsets or thresholds.

5. Third Embodiment

Figure 15:
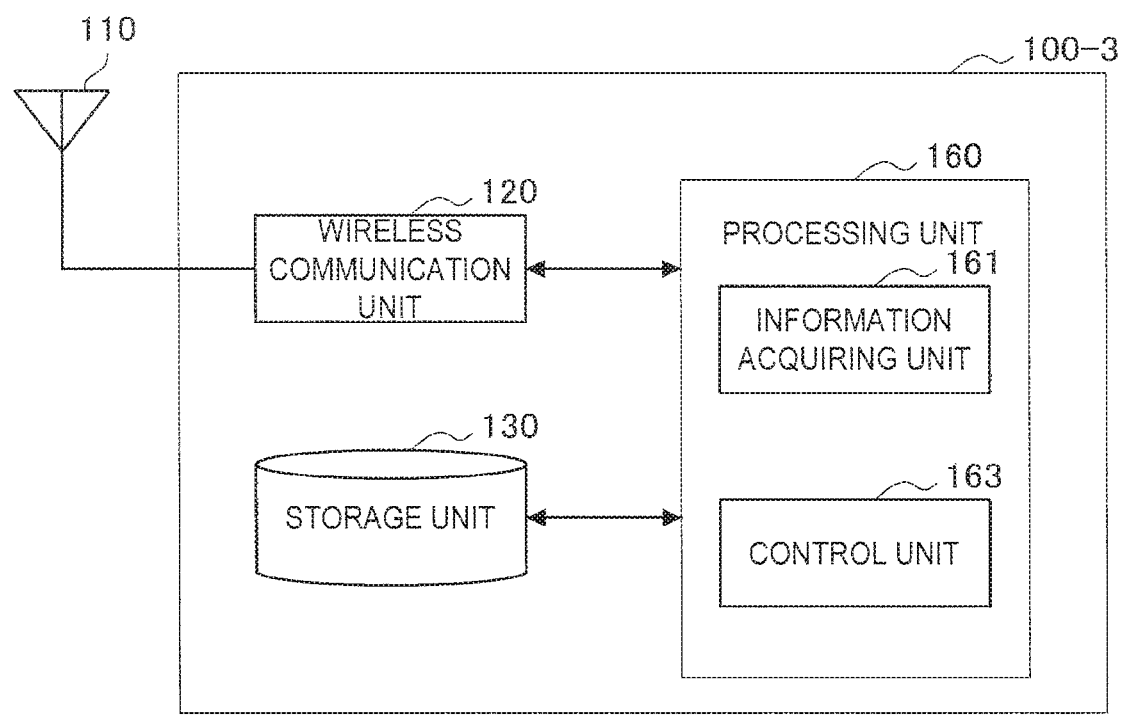
FIG. 15 is a block diagram illustrating an example of a configuration of a terminal device according to a third embodiment.
Figure 16:
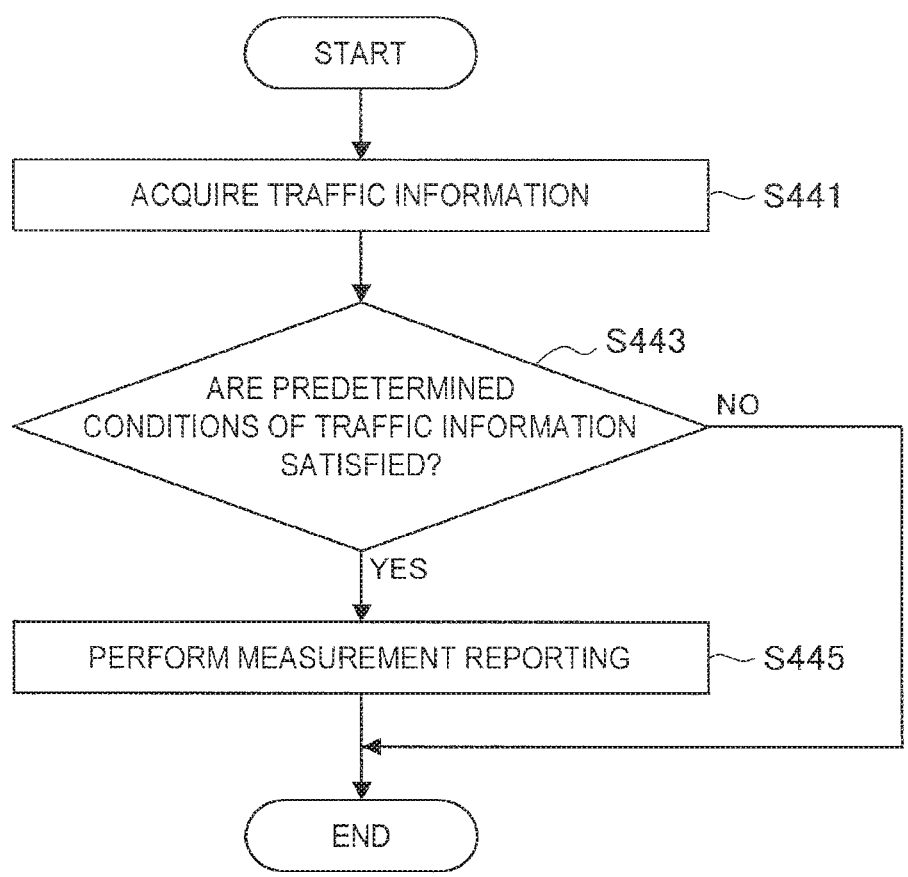
FIG. 16 is a sequence diagram illustrating an example of a schematic flow of a process according to the third embodiment.

Next, a third embodiment of the present disclosure will be described with reference to FIG. 15 and FIG. 16.

<5.1. Outline>

Generally, a base station decides a handover of a terminal device based on a measurement result reported by the terminal device. In addition, the terminal device reports the measurement result to a base station periodically or according to a generation of an event.

In an environment in which the on/off state of a cell (for example, a small cell) is switched, when carrier aggregation is performed, each component carrier (CC) is activated or deactivated. For example, when traffic of the terminal device increases, a deactivated CC is preferably activated (that is, a cell in the off state preferably is in the on state). However, in an existing event, when traffic of the terminal device increases, there is a possibility of a measurement result not being reported to a base station.

Thus, it is preferable to provide a mechanism through which it is possible to perform measurement reporting suitable for an environment in which the on/off state of a cell is switched.

In the third embodiment, a terminal device 100-3 performs measurement reporting when predetermined conditions of traffic of the terminal device 100-3 are satisfied. Accordingly, for example, it is possible to perform measurement reporting suitable for an environment in which the on/off state of a cell is switched. More specifically, for example, measurement reporting useful for selecting a carrier (a cell) to be added according to an increase of traffic is performed.

<5.2. Configuration of Terminal Device>

Next, examples of configurations of the terminal device 100-3 according to the third embodiment will be described with reference to FIG. 15. FIG. 15 is a block diagram illustrating an example of a configuration of the terminal device 100-3 according to the third embodiment. As illustrated in FIG. 15, the terminal device 100-3 includes the antenna unit 110, the wireless communication unit 120, the storage unit 130 and a processing unit 160.

There is no difference in descriptions of the antenna unit 110, the wireless communication unit 120 and the storage unit 130 between the first embodiment and the third embodiment except for different reference numerals. Therefore, redundant descriptions will be omitted here, and only the processing unit 160 will be described.

(Processing Unit 160)

The processing unit 160 provides various functions of the terminal device 100-3. The processing unit 160 includes an information acquiring unit 161 and a control unit 163. The processing unit 160 may further include a component other than these components. That is, the processing unit 160 may also perform an operation other than operations of these components.

(Information Acquiring Unit 161)

The information acquiring unit 161 acquires information about traffic of the terminal device 100-3 (hereinafter referred to as "traffic information").

As a first example, the traffic information is a traffic load of the terminal device 100-3. As a second example, the traffic information may be an amount of traffic of the terminal device 100-3.

For example, the processing unit 160 calculates the traffic information and the information acquiring unit 161 acquires the traffic information.

(Control Unit 163)

The control unit 163 performs measurement reporting when predetermined conditions of the traffic information are satisfied.

(a) Predetermined Conditions (a-1) First Example

As described above, as a first example, the traffic information is a traffic load of the terminal device 100-3. In this case, the predetermined conditions include a condition that the traffic load of the terminal device 100-3 be equal to or greater than a threshold. That is, the control unit 163 performs measurement reporting when the traffic load of the terminal device 100-3 is equal to or greater than the threshold.

(a-2) Second Example

As described above, as a second example, the traffic information may be an amount of traffic of the terminal device 100-3. In this case, the predetermined conditions may include a condition that the amount of traffic of the terminal device 100-3 be equal to or greater than a threshold. That is, the control unit 163 may perform measurement reporting when the amount of traffic of the terminal device 100-3 is equal to or greater than the threshold. The threshold may be average throughput of the terminal device 100-3.

(b) Measurement reporting (b-1) Target Cell

For example, the measurement reporting includes measurement reporting of a cell in the off state. More specifically, for example, the measurement reporting includes measurement reporting of a small cell in the off state. That is, the control unit 163 performs measurement reporting of a small cell in the off state when the predetermined conditions are satisfied.

Accordingly, for example, a cell in the off state may be switched to the on state according to an increase of traffic.

The measurement reporting may include measurement reporting of a cell in the on state.

(b-2) Measurement

The measurement reporting is reporting of a result of measurement performed by the terminal device 100-3. The measurement is RRM measurement, for example, measurement of reception power or reception quality. More specifically, for example, the measurement is measurement of RSRP or RSRQ.

The measurement is performed based on a reference signal. The reference signal is, for example, a CRS that is transmitted in a cell in the on state and/or a DRS that is transmitted in a cell in the off state (and a cell in the on state).

Alternatively, the measurement (for example, measurement of a serving cell and a neighbour cell) may be performed by the control unit 163 or may be performed by another component included in the processing unit 160.

<5.3. Process Flow>

Next, an example of a process according to the third embodiment will be described with reference to FIG. 16. FIG. 16 is a flowchart illustrating an example of a schematic flow of a process according to the third embodiment.

The information acquiring unit 161 acquires information about traffic of the terminal device 100-3 (that is, traffic information) (S441).

Then, the information acquiring unit 161 determines whether predetermined conditions of the traffic information are satisfied (S443). When the predetermined conditions are not satisfied (NO in S443), the process ends.

When the predetermined conditions are satisfied (YES in S443), the control unit 163 performs measurement reporting (S445). The measurement reporting includes, for example, measurement reporting of a cell in the off state. Then, the process ends.

6. Fourth Embodiment

Figure 17:
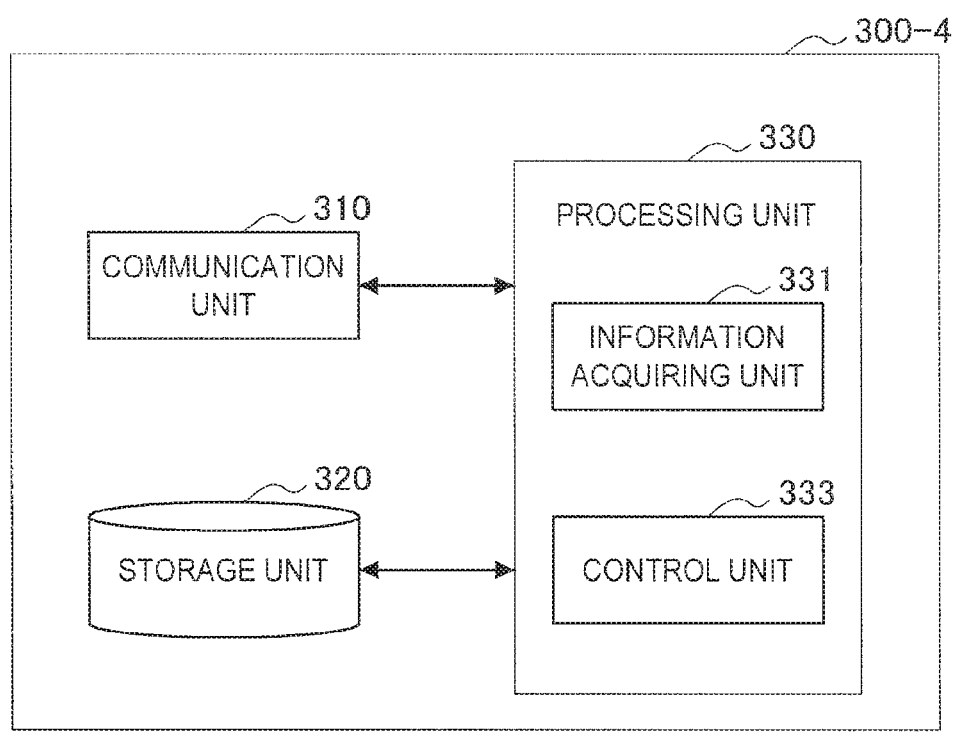
FIG. 17 is a block diagram illustrating an example of a configuration of a control entity according to the fourth embodiment.
Figure 18:
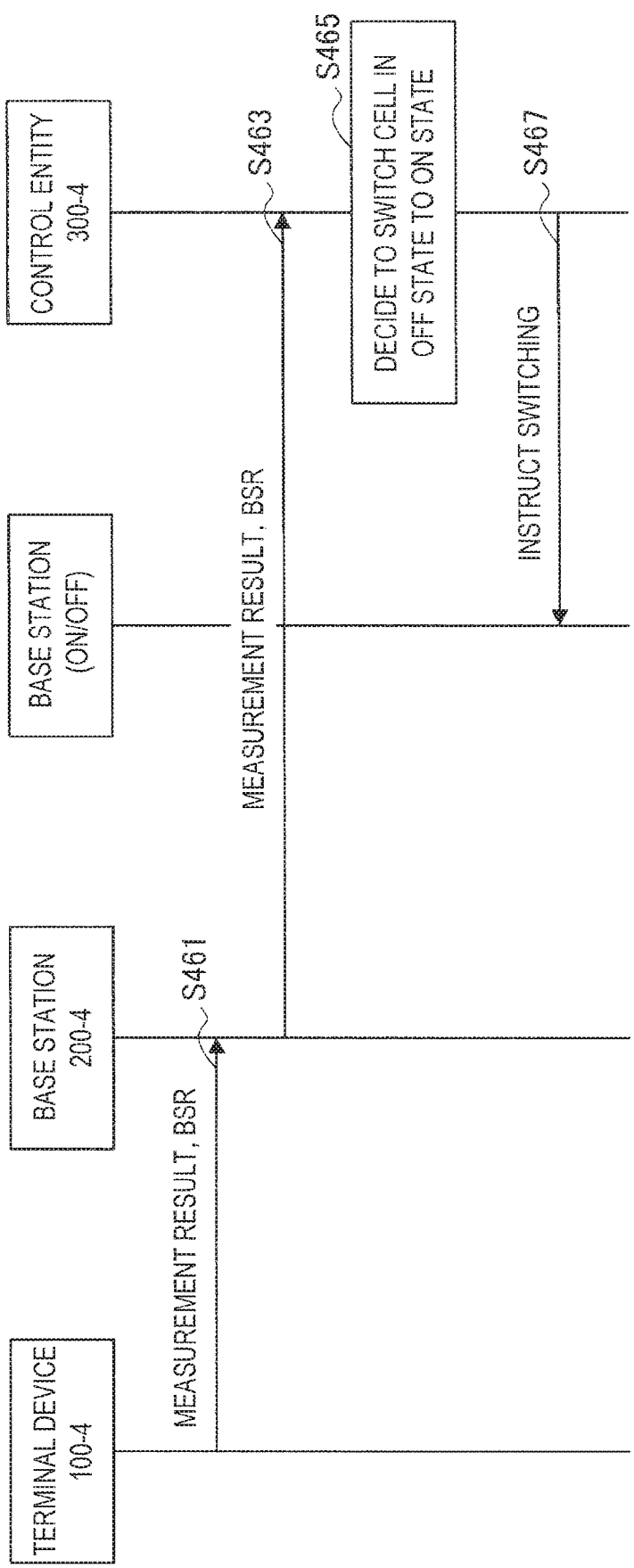
FIG. 18 is a sequence diagram illustrating an example of a schematic flow of a process according to the fourth embodiment.

Next, a fourth embodiment of the present disclosure will be described with reference to FIG. 17 and FIG. 18.

<6.1. Outline>

In order to suppress interference with a neighbour cell, adaptive switching of the on/off state of a cell (for example, a small cell) is being studied.

However, for example, when the on/off state of a cell is switched based on (only) a result of measurement performed by a terminal device, there is a possibility of the cell being switched from the on state to the off state regardless of a low necessity for the terminal device. As an example, when the terminal device attempts to transmit a very small amount of packets, the terminal device does not immediately perform communication in a cell in the on state having a low signal strength, but a cell in the off state having a high signal strength is switched to the on state, and the terminal device is then likely to perform communication in the cell.

Thus, it is preferable to provide a mechanism through which it is possible to more appropriately switch the on/off state of a cell.

In the fourth embodiment, a control entity 300-4 decides to switch a cell to the on state based on a measurement result of the cell in the off state and information about a buffer status of a terminal device 100-4, which are reported by the terminal device 100-4. Accordingly, for example, it is possible to more appropriately switch the on/off state of a cell. More specifically, for example, when a necessity is high, a cell in the off state is switched to the on state.

<6.2. Configuration of Control Entity>

Next, an example of a configuration of the control entity 300-4 according to the fourth embodiment will be described with reference to FIG. 17. FIG. 17 is a block diagram illustrating an example of a configuration of the control entity 300-4 according to the fourth embodiment. Referring to FIG. 17, the control entity 300-4 includes a communication unit 310, a storage unit 320, and a processing unit 330.

(Communication Unit 310)

The communication unit 310 transmits and receives information. For example, the communication unit 310 transmits information to another node and receives information from the other node. For example, the other node includes a core network and a base station. As an example, the other node includes a base station 200-4.

(Storage Unit 320)

The storage unit 320 temporarily or permanently stores a program and data for an operation of the control entity 300-4.

(Processing Unit 330)

The processing unit 330 provides various functions of the control entity 300-4. The processing unit 330 includes an information acquiring unit 331 and a control unit 333. The processing unit 330 may further include any other component in addition to the above-mentioned components. In other words, the processing unit 330 may also perform an operation other than operations of the above-mentioned components.

(Information Acquiring Unit 331)

The information acquiring unit 331 acquires a measurement result of a cell in the off state and information about a buffer status of the terminal device 100-4, which are reported by the terminal device 100-4. The cell is, for example, a small cell in the off state.

For example, the information is a buffer status report (BSR) from the terminal device 100-4.

Specifically, for example, the terminal device 100-4 reports the measurement result of a cell in the off state to the base station 200 together with the BSR of the terminal device 100-4. Then, the base station 200-4 provides the measurement result and the BSR to the control entity 300-4. Then, the information acquiring unit 331 acquires the measurement result and the BSR.

Alternatively, the terminal device 100-4 may provide a BSR that is already acquired by the base station 200 to the control entity 300-4 with the measurement result without reporting the BSR with the measurement result. In addition, the information may be another piece of information indicating a buffer status of the terminal device 100-4 rather than the BSR.

(Control Unit 333)

The control unit 333 decides to switch a cell to the on state based on the measurement result and the information (for example, the BSR).

For example, when the measurement result is favorable and a great amount of data is accumulated in a buffer of the terminal device 100-4, the control unit 333 decides to switch the cell to the on state. More specifically, for example, when the measurement result is equal to or greater than a first threshold and a data amount accumulated in the buffer of the terminal device 100-4 is equal to or greater than a second threshold, the control unit 333 decides to switch the cell to the on state.

In addition, for example, when the switching is decided, the control unit 333 instructs a base station of the cell to perform the switching.

It should be understood that the control unit 333 may decide to switch the cell to the on state based on the measurement result and the information (for example, the BSR) from a plurality of terminal devices 100-4 rather than based on only the measurement result and the information (for example, the BSR) from a single terminal device 100-4.

<6.3. Process Flow>

Next, an example of a process according to the fourth embodiment will be described with reference to FIG. 18. FIG. 18 is a sequence diagram illustrating an example of a schematic flow of a process according to the fourth embodiment.

The terminal device 100-4 reports a measurement result of a cell in the off state and a BSR to the base station 200-4 (S461).

The base station 200-4 provides the measurement result and the BSR to the control entity 300-4 (S463). The control entity 300-4 (the information acquiring unit 331) acquires the measurement result and the BSR.

The control entity 300-4 (the control unit 333) decides to switch the cell in the off state to the on state based on the measurement result and the BSR (S465).

Then, the control entity 300-4 (the control unit 333) instructs a base station of the cell to perform the switching (S467).

7. Fifth Embodiment

Figure 19:
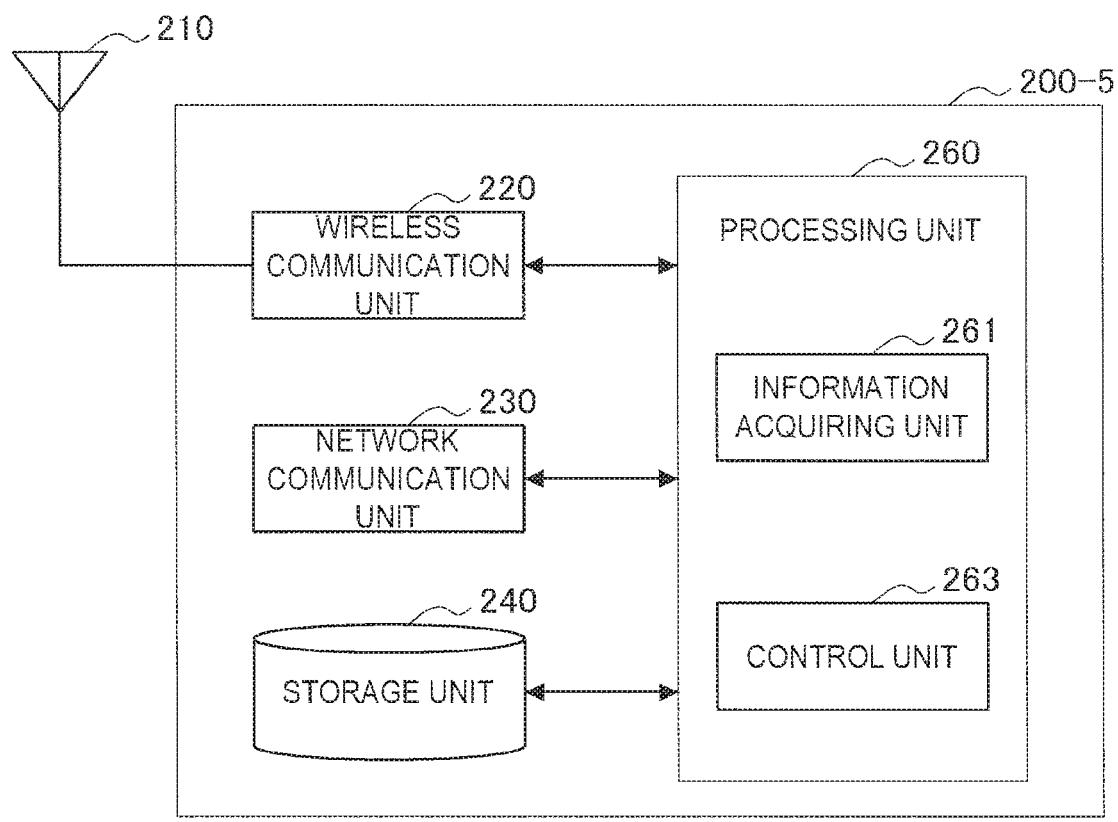
FIG. 19 is a block diagram illustrating an example of a configuration of a base station according to the fifth embodiment.
Figure 20:
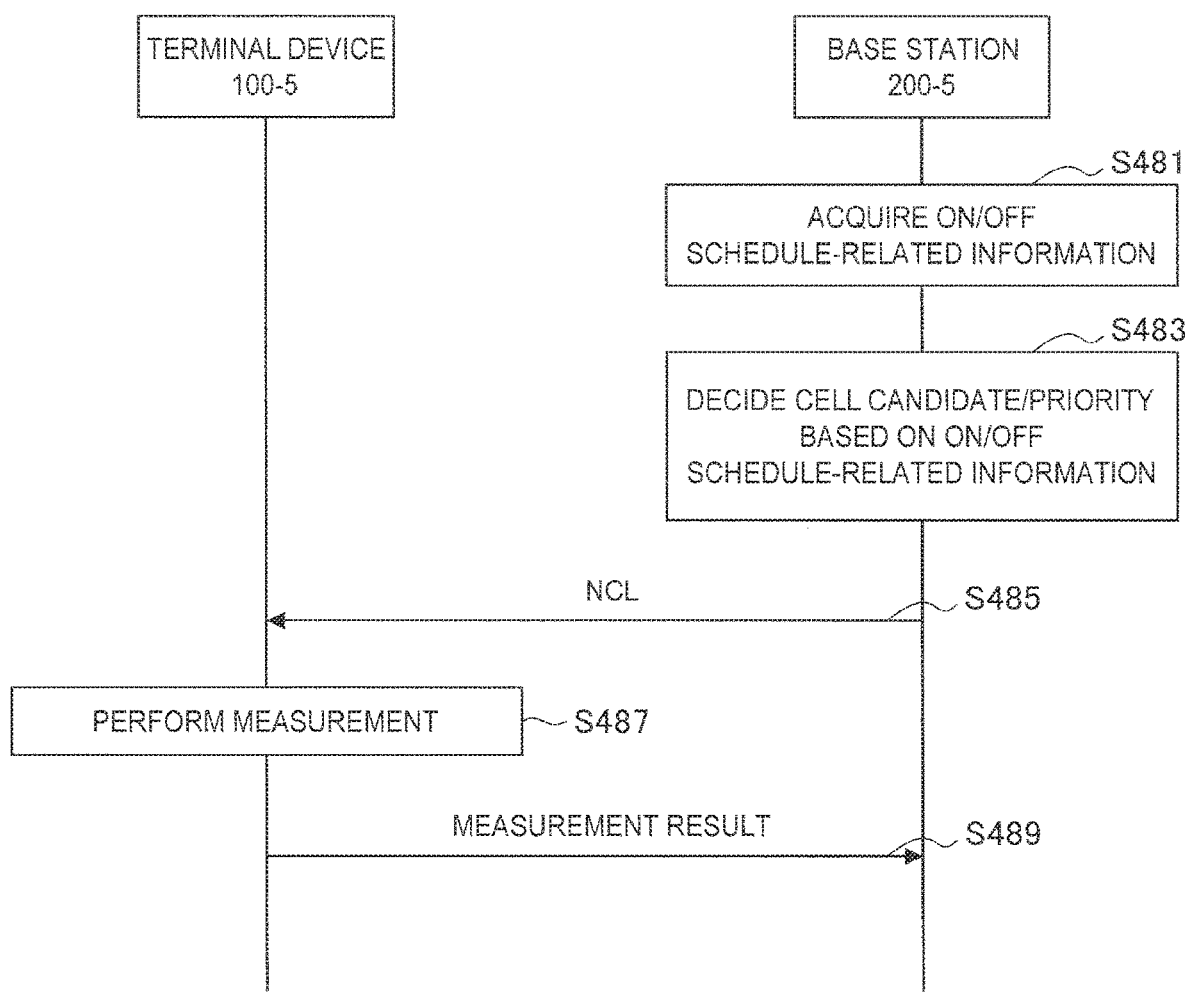
FIG. 20 is a sequence diagram illustrating an example of a schematic flow of a process according to the fifth embodiment.

Next, a fifth embodiment of the present disclosure will be described with reference to FIG. 19 and FIG. 20.

<7.1. Outline>

Generally, a terminal device performs measurement based on a neighbour cell list (NCL) provided from a network (a base station).

In an environment in which the on/off state of a cell (for example, a small cell) is switched, a base station of a cell in the off state transmits a DRS and a terminal device performs measurement of the cell in the off state based on the DRS. Then, measurement reporting is performed according to a measurement result and the cell in the off state may be switched to the on state. However, for example, in an existing NCL, since the on/off state of a cell is not considered, the terminal device may perform unpreferable measurement and measurement reporting. As an example, the terminal device performs measurement and measurement reporting of a cell, a handover of the terminal device to the cell is performed, and the cell may be then switched from the on state to the off state. As a result, an additional handover is necessary and system performance may decrease.

Thus, it is preferable to provide a mechanism through which it is possible to perform measurement reporting suitable for the environment in which the on/off state of a cell is switched.

In the fifth embodiment, a base station 200-5 decides a candidate of a cell whose measurement is to be performed by a terminal device 100-5 or a priority of the candidate of the cell based on information about a schedule of the on/off state of the cell. Accordingly, for example, it is possible to perform measurement reporting suitable for an environment in which the on/off state of a cell is switched. More specifically, for example, measurement reporting of a cell that is unlikely to be in the off state is performed rather than measurement reporting of a cell that is likely to be in the off state. As a result, a handover to the cell that is unlikely to be in the off state may be performed.

<7.2. Configuration of Base Station>

Next, an example of a configuration of the base station 200-5 according to the fifth embodiment will be described with reference to FIG. 19. FIG. 19 is a block diagram illustrating an example of a configuration of the base station 200-5 according to the fifth embodiment. Referring to FIG. 19, the base station 200-5 includes an antenna unit 210, a wireless communication unit 220, a network communication unit 230, a storage unit 240, and a processing unit 260.

There is no difference in descriptions of the antenna unit 210, the wireless communication unit 220, the network communication unit 230 and the storage unit 240 between the second embodiment and the fifth embodiment except for different reference numerals. Therefore, redundant descriptions will be omitted here, and only the processing unit 260 will be described.

(Processing Unit 260)

The processing unit 260 provides various functions of the base station 200-5. The processing unit 260 includes an information acquiring unit 261 and a control unit 263. The processing unit 260 may further include any other component in addition to the above-mentioned components. In other words, the processing unit 260 may also perform an operation other than operations of the above-mentioned components.

(Information Acquiring Unit 261)

The information acquiring unit 261 acquires information about a schedule of the on/off state of a cell (hereinafter referred to as "on/off schedule-related information"). The cell is, for example, a small cell.

(a) On/Off Schedule-Related Information (a-1) Off Schedule Information

As a first example, the on/off schedule-related information is information indicating a schedule of switching from the on state to the off state (hereinafter referred to as "off schedule information"). For example, the off schedule information indicates a cell having a schedule of switching from the on state to the off state. Specifically, the off schedule information may be information indicating only a cell having a schedule of switching from the on state to the off state or may be information indicating whether each cell has such a schedule.

(a-2) on State Continuation Time Information

As a second example, the on/off schedule-related information may be information (hereinafter referred to as "on state continuation time information") indicating a time during which the on state of a cell continues (hereinafter referred to as an "on state continuation time"). For example, the on state continuation time information indicates a time during which the on state of a cell continues for each cell (that is, the on state continuation time).

For example, a cell continues in the on state at least until the on state continuation time. The cell may further continue in the on state after the on state continuation time arrives or may be switched to the off state when the on state continuation time arrives.

Alternatively, the on state continuation time may be an absolute time (for example, a system frame number (SFN)) or may be a relative time based on any time.

The on state continuation time may be calculated based on parameters of a small cell such as a buffer status in the small cell, the number of accommodated users, an amount of traffic and on/off statistical data.

(b) Specific Process

For example, another node (for example, a control entity 300-5) generates on/off schedule-related information and provides the on/off schedule-related information to the base station 200-5. Then, the on/off schedule-related information is stored in the storage unit 240. The information acquiring unit 261 acquires the on/off schedule-related information from the storage unit 240 at any time thereafter.

(Control Unit 263)

(a) Decision of Cell Candidate/Priority

The control unit 263 decides a candidate of a cell whose measurement is to be performed by the terminal device 100-5 or a priority of the candidate of the cell based on the on/off schedule-related information.

(a-1) Off Schedule Information

As described above, as a first example, the on/off schedule-related information is the off schedule information (that is, information indicating a schedule of switching from the on state to the off state).

In this case, for example, the control unit 263 does not include a cell having a schedule of switching from the on state to the off state in a candidate of the cell. More specifically, for example, the control unit 263 decides an NCL such that a cell having a schedule of switching from the on state to the off state is not included in the NCL. Accordingly, for example, measurement reporting of only a cell that does not have a schedule of the off state is performed.

Alternatively, the control unit 263 may set a priority of a cell having a schedule of switching from the on state to the off state to be lower. More specifically, the control unit 263 may decide an NCL such that a priority of a cell having a schedule of switching from the on state to the off state becomes lower (for example, the lowest priority). Accordingly, for example, measurement reporting of a cell that does not have a schedule of the off state is preferentially performed.

(a-2) on State Continuation Time Information

As described above, as a second example, the on/off schedule-related information may be the on state continuation time information (that is, information indicating a time during which the on state of a cell continues (the on state continuation time)).

In this case, the control unit 263 may not include a cell whose on state continuation time arrives within a predetermined period in a candidate of the cell. More specifically, the control unit 263 may decide an NCL such that a cell whose on state continuation time arrives within the predetermined period is not included in the NCL. Accordingly, for example, measurement reporting of only a cell whose on state continues for a sufficient period is performed.

Alternatively, the control unit 263 may set a priority of a cell whose on state continuation time arrives within a predetermined period to be lower. More specifically, the control unit 263 may decide an NCL such that a priority of a cell whose on state continuation time arrives within the predetermined period becomes lower (for example, the lowest priority). Accordingly, for example, measurement reporting of a cell whose on state continues for a sufficient time is preferentially performed.

When the on state continuation time information is generated for each terminal device 100-5, the "predetermined period" may be replaced by "a period for the terminal device 100-5 to transmit data." That is, the control unit 263 may not include a cell whose on state continuation time arrives within a period for the terminal device 100-5 to transmit data in a candidate of the cell or may set a priority of a cell whose on state continuation time arrives within the period for the terminal device 100-5 to transmit data to be lower.

In addition, a candidate of a cell in the NCL and/or a priority in the NCL may be decided based on not only the on/off schedule-related information but also other information such as a buffer status report (BSR), quality of service (QoS) and/or statistical data of communication situations.

(a-3) Measurement

The measurement is RRM measurement, for example, measurement of reception power or reception quality. More specifically, for example, the measurement is measurement of RSRP or RSRQ.

As an example, the measurement is inter-frequency measurement. That is, the measurement is measurement of a frequency band (for example, a component carrier) that is not used by the terminal device 100-5.

(b) Notification

For example, the control unit 263 notifies the terminal device 100-5 of the decided candidate or priority of the cell.

More specifically, for example, the control unit 263 notifies the terminal device 100-5 of an NCL indicating the decided candidate or priority of the cell. For example, the control unit 263 notifies the terminal device 100-5 of the NCL through system information (for example, an SIB). Alternatively, the control unit 263 may notify the terminal device 100-5 of the NCL through individual signaling (for example, RRC signaling).

<7.3. Process Flow>

Next, an example of a process according to the fifth embodiment will be described with reference to FIG. 20. FIG. 20 is a sequence diagram illustrating an example of a schematic flow of a process according to the fifth embodiment.

The base station 200-5 (the information acquiring unit 261) acquires information about a schedule of the on/off state of a cell (that is, on/off schedule-related information) (S481).

Then, the base station 200-5 (the control unit 263) decides a candidate of a cell whose measurement is to be performed by the terminal device 100-5 or a priority of the candidate of the cell based on the on/off schedule-related information (S483). Specifically, for example, the base station 200-5 decides an NCL based on the on/off schedule-related information.

Then, the base station 200-5 (the control unit 263) notifies the terminal device 100-5 of the NCL (S485).

The terminal device 100-5 performs measurement based on the NCL (S487). Specifically, for example, the terminal device 100-5 performs measurement of the candidate of the cell included in the NCL according to the priority of the candidate of the cell included in the NCL.

Then, the terminal device 100-5 performs measurement reporting (S489).

The fifth embodiment has been described above. In the fifth embodiment, the base station 200-5 acquires on/off schedule-related information and decides a candidate of a cell whose measurement is to be performed by the terminal device 100-5 or a priority of the candidate of the cell based on the on/off schedule-related information. However, the fifth embodiment is not limited thereto. For example, instead of the base station 200-5, the control entity 300-5 may acquire on/off schedule-related information and decide a candidate of a cell whose measurement is to be performed by the terminal device 100-5 or a priority of the candidate of the cell based on the on/off schedule-related information. Thus, the control entity 300-5 may notify the base station 200-5 of the decided candidate or priority of the cell.

8. Sixth Embodiment

Figure 21:
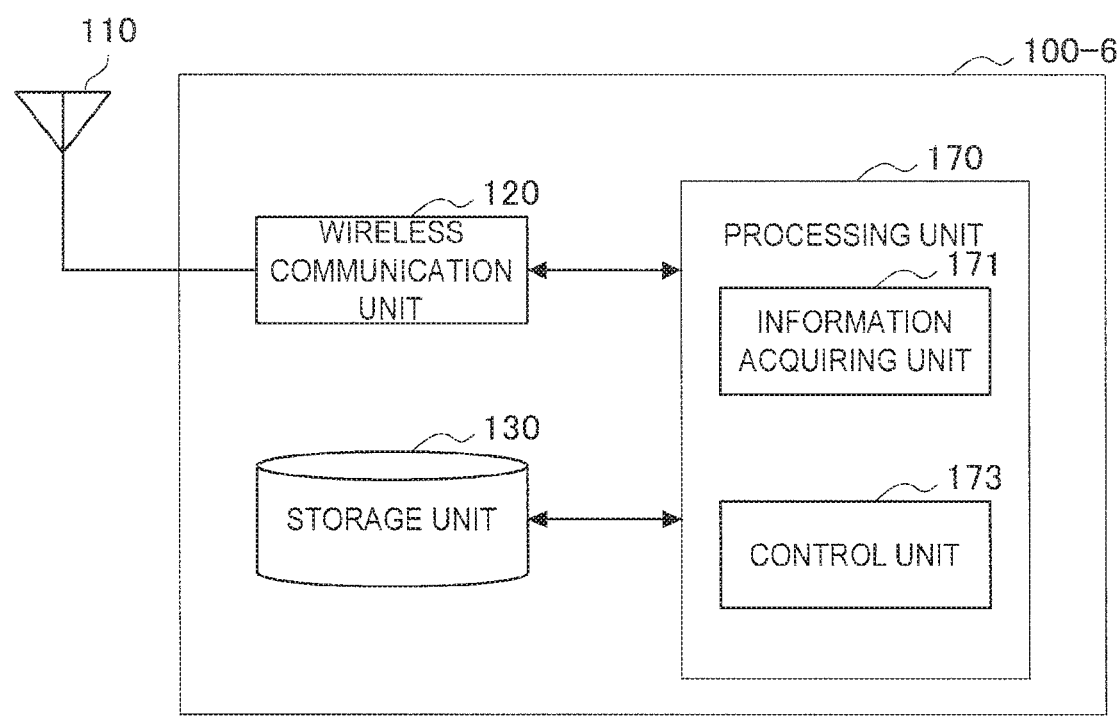
FIG. 21 is a block diagram illustrating an example of a configuration of a terminal device according to the sixth embodiment.
Figure 22:
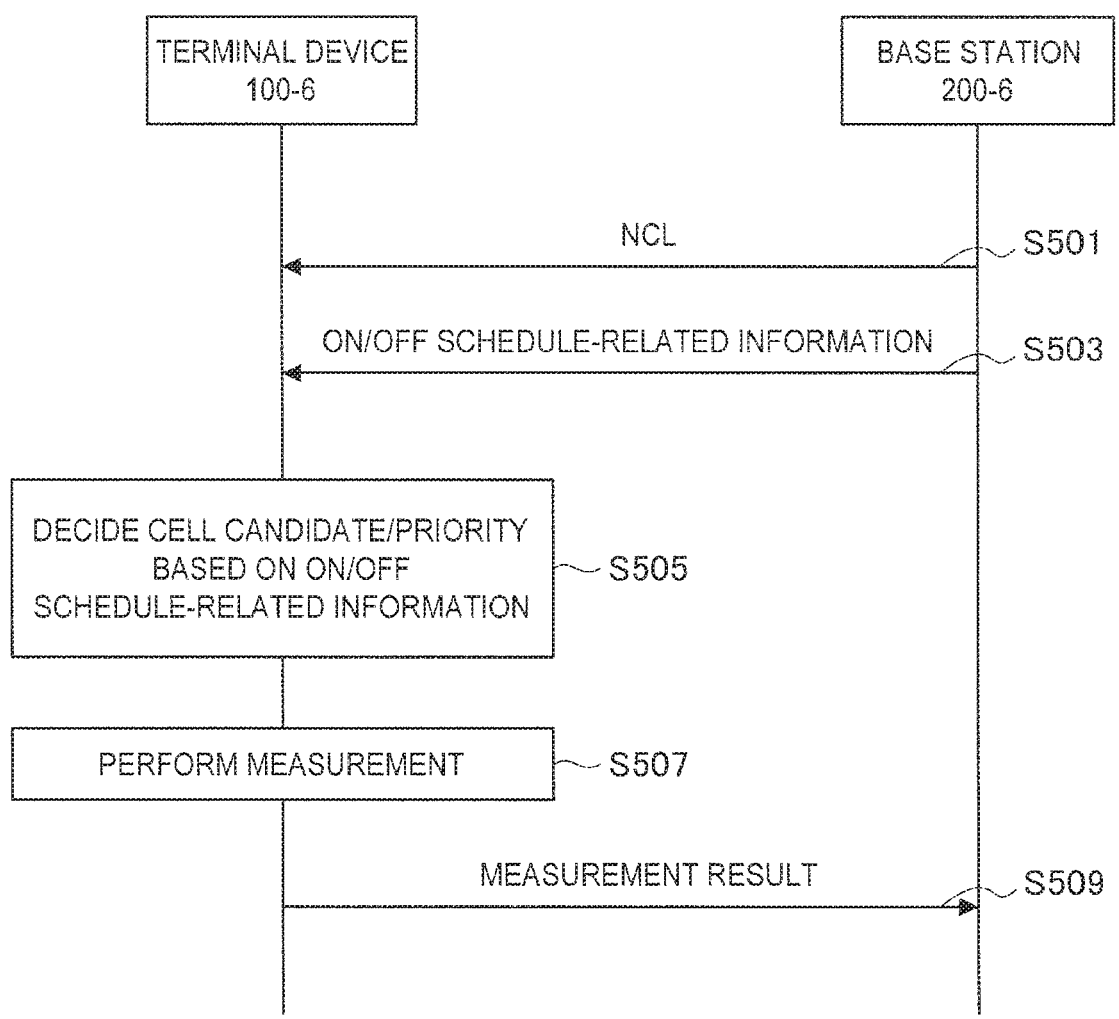
FIG. 22 is a sequence diagram illustrating an example of a schematic flow of a process according to the sixth embodiment.

Next, a sixth embodiment of the present disclosure will be described with reference to FIG. 21 and FIG. 22.

<8.1. Outline>

In the fifth embodiment, the base station 200-5 decides a candidate of a cell whose measurement is to be performed by the terminal device 100-5 or a priority of the candidate of the cell based on information about a schedule of the on/off state of the cell.

Conversely, in the sixth embodiment, a terminal device 100-6 decides a candidate of a cell whose measurement is to be performed by the terminal device 100-6 or a priority of the candidate of the cell based on information about a schedule of the on/off state of the cell.

<8.2. Configuration of Terminal Device>

First, an example of a configuration of the terminal device 100-6 according to the sixth embodiment will be described with reference to FIG. 21. FIG. 21 is a block diagram illustrating an example of a configuration of the terminal device 100-6 according to the sixth embodiment. As illustrated in FIG. 21, the terminal device 100-6 includes the antenna unit 110, the wireless communication unit 120, the storage unit 130 and a processing unit 170.

There is no difference in descriptions of the antenna unit 110, the wireless communication unit 120 and the storage unit 130 between the first embodiment and the sixth embodiment except for different reference numerals. Therefore, redundant descriptions will be omitted here, and only the processing unit 170 will be described.

(Processing Unit 170)

The processing unit 170 provides various functions of the terminal device 100-6. The processing unit 170 includes an information acquiring unit 171 and a control unit 173. The processing unit 170 may further include a component other than these components. That is, the processing unit 170 may also perform an operation other than operations of these components.

(Information Acquiring Unit 171)

The information acquiring unit 171 acquires information about a schedule of the on/off state of a cell (hereinafter referred to as "on/off schedule-related information"). The cell is, for example, a small cell.

(a) On/Off Schedule-Related Information

There is no difference in descriptions of the on/off schedule-related information between the fifth embodiment and the sixth embodiment. Therefore, redundant descriptions will be omitted here.

(b) Specific Process

For example, a base station 200-6 notifies the terminal device 100-6 of the on/off schedule-related information. Specifically, for example, the base station 200-6 notifies the terminal device 100-6 of the on/off schedule-related information through system information (for example, an SIB) or through individual signaling (for example, RRC signaling). Then, the on/off schedule-related information is stored in the storage unit 130. The information acquiring unit 171 acquires the on/off schedule-related information from the storage unit 130 at any time thereafter.

As described above, the information acquiring unit 171 acquires the on/off schedule-related information. In addition, for example, the information acquiring unit 171 acquires an NCL. The on/off schedule-related information may be included in the NCL or may be information other than the NCL. When the on/off schedule-related information is information other than the NCL, the terminal device 100-6 may be notified of the information together with the NCL, or the terminal device 100-6 may be notified of the information separately from the NCL.

(Control Unit 173)

(a) Decision of Cell Candidate/Priority

The control unit 173 decides a candidate of a cell whose measurement is to be performed by the terminal device 100-6 or a priority of the candidate of the cell based on the on/off schedule-related information.

(a-1) Off Schedule Information

As a first example, the on/off schedule-related information may be the off schedule information (that is, information indicating a schedule of switching from the on state to the off state).

In this case, for example, the control unit 173 does not include a cell having a schedule of switching from the on state to the off state in a candidate of the cell. More specifically, for example, the control unit 173 decides a cell that does not have a schedule of the switching among neighbour cells included in the NCL as a candidate of a cell whose measurement is to be performed by the terminal device 100-6. Accordingly, for example, measurement and measurement reporting of only a cell that does not have a schedule of the off state are performed.

Alternatively, the control unit 173 may set a priority of a cell having a schedule of switching from the on state to the off state to be lower. More specifically, the control unit 173 may change a priority of a cell having a schedule of the switching among priorities of neighbour cells included in the NCL to a lower priority (for example, the lowest priority). Accordingly, for example, measurement and measurement reporting of a cell that does not have a schedule of the off state are preferentially performed.

(a-2) on State Continuation Time Information

As a second example, the on/off schedule-related information may be the on state continuation time information (that is, information indicating a time during which the on state of a cell continues (an on state continuation time)).

In this case, the control unit 173 may not include a cell whose on state continuation time arrives within a period for the terminal device 100-6 to transmit data in a candidate of the cell. More specifically, for example, the control unit 173 may estimate a period for transmitting data (for example, a sufficient period for transmitting data) from a buffer status of the terminal device 100-6. Then, the control unit 173 may decide a cell whose on state continuation time does not arrive within the estimated period among neighbour cells included in the NCL as a candidate of a cell whose measurement is to be performed by the terminal device 100-6. Accordingly, for example, measurement reporting of only a cell whose on state continues for a sufficient period is performed.

Alternatively, the control unit 173 may set a priority of a cell whose on state continuation time arrives within a period for the terminal device 100-6 to transmit data to be lower. More specifically, more specifically, for example, the control unit 173 may estimate a period for transmitting data (for example, a sufficient period for transmitting data) from a buffer status of the terminal device 100-6. Then, the control unit 173 may change a priority of a cell whose on state continuation time arrives within the estimated period among priorities of neighbour cells included in the NCL to a lower priority (for example, the lowest priority). Accordingly, for example, measurement reporting of a cell whose on state continues for a sufficient time is preferentially performed.

The term "period for the terminal device 100-6 to transmit data" may be replaced by the term "predetermined period." That is, the control unit 173 may not include a cell whose on state continuation time arrives within a predetermined period in a candidate of the cell or may set a priority of a cell whose on state continuation time arrives within the predetermined period to be lower.

(a-3) Measurement

The measurement is RRM measurement, for example, measurement of reception power or reception quality. More specifically, for example, the measurement is measurement of RSRP or RSRQ.

As an example, the measurement is inter-frequency measurement. That is, the measurement is measurement of a frequency band (for example, a component carrier) that is not used by the terminal device 100-5.

(b) Measurement and Measurement Reporting

For example, the control unit 173 performs measurement based on the decided candidate of the cell or the priority. Specifically, for example, the control unit 173 performs measurement of the decided candidate of the cell. Alternatively, the control unit 173 performs measurement of the candidate of the cell according to the decided priority.

In addition, for example, the control unit 173 performs measurement reporting to the base station 200-6. That is, the control unit 173 reports a result of the measurement to the base station 200-6.

Alternatively, at least one of measurement and measurement reporting may be performed by another component included in the processing unit 170 rather than the control unit 173.

<8.3. Process Flow>

Next, an example of a process according to the sixth embodiment will be described with reference to FIG. 22. FIG. 22 is a sequence diagram illustrating an example of a schematic flow of a process according to the sixth embodiment.

The base station 200-6 notifies the terminal device 100-6 of an NCL (S501). The terminal device 100-6 (the information acquiring unit 171) acquires the NCL.

In addition, the base station 200-6 notifies the terminal device 100-6 of information about a schedule of the on/off state of a cell (that is, on/off schedule-related information) (S503). The terminal device 100-6 (the information acquiring unit 171) acquires the information.

Then, the terminal device 100-6 (the control unit 173) decides a candidate of a cell whose measurement is to be performed by the terminal device 100-6 or a priority of the candidate of the cell based on the on/off schedule-related information (S505).

Then, the terminal device 100-6 performs measurement based on the decided candidate or priority (or the NCL) of the cell (S507).

Then, the terminal device 100-6 performs measurement reporting (S509).

9. Seventh Embodiment

Next, a seventh embodiment of the present disclosure will be described with reference to FIG. 22 to FIG. 25.

<9.1. Outline>

In order to suppress interference with a neighbour cell, adaptive switching of the on/off state of a cell (for example, a small cell) is being studied. However, after a handover of a terminal device to a cell, the cell is switched to the off state, and the terminal device is likely to hardly perform communication in the cell.

Thus, it is preferable to provide a mechanism through which a terminal device can perform communication for a certain amount of time even in a cell associated with switching the on/off state.

In the seventh embodiment, a terminal device 100-7 requests that a serving cell that is a cell associated with switching the on/off state continue in the on state. Accordingly, for example, the terminal device 100-7 can perform communication for a certain amount of time even in a cell associated with switching the on/off state.

<9.2. Configuration of Terminal Device>

Figure 23:
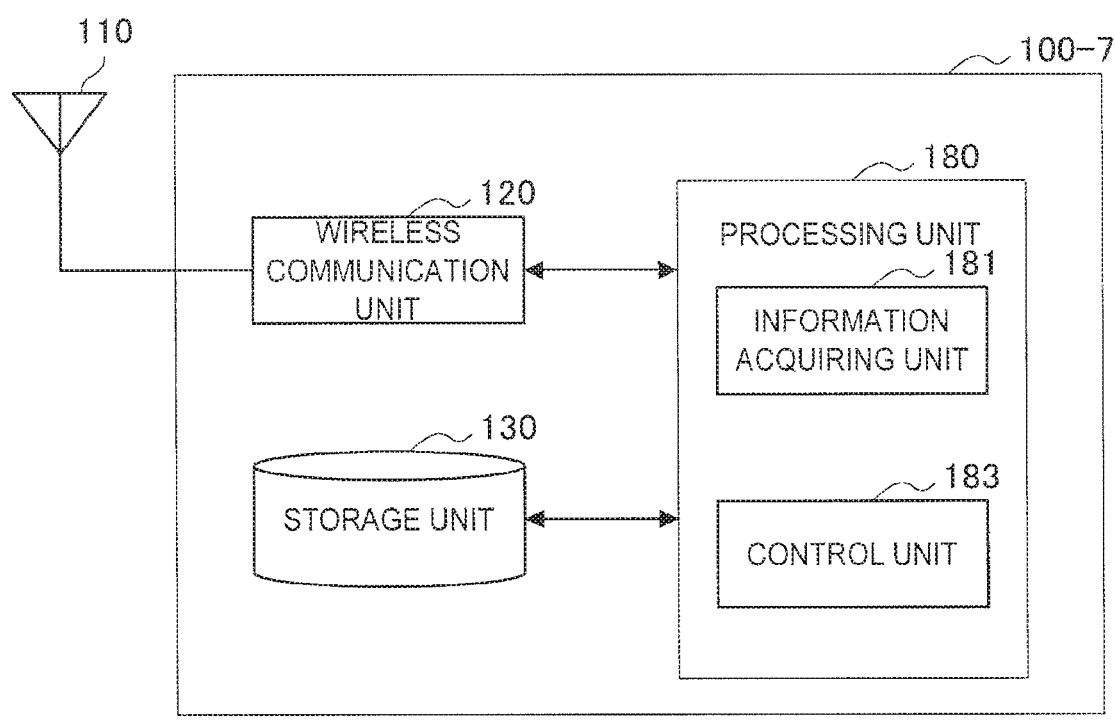
FIG. 23 is a block diagram illustrating an example of a configuration of a terminal device according to the seventh embodiment.

Next, an example of a configuration of the terminal device 100-7 according to the seventh embodiment will be described with reference to FIG. 23. FIG. 23 is a block diagram illustrating an example of a configuration of the terminal device 100-7 according to the seventh embodiment. As illustrated in FIG. 23, the terminal device 100-7 includes the antenna unit 110, the wireless communication unit 120, the storage unit 130 and a processing unit 180.

There is no difference in descriptions of the antenna unit 110, the wireless communication unit 120 and the storage unit 130 between the first embodiment and the seventh embodiment except for different reference numerals. Therefore, redundant descriptions will be omitted here, and only the processing unit 180 will be described.

(Information Acquiring Unit 181)

An information acquiring unit 181 acquires information indicating that a serving cell is a cell associated with switching the on/off state. The serving cell is a cell of a base station 200-7. In addition, for example, the serving cell is a small cell.

For example, the base station 200-7 transmits information indicating that a cell of the base station 200-7 is a cell associated with switching the on/off state to the terminal device 100-7, and the terminal device 100-7 receives the information. Then, the information is stored in the storage unit 130. The information acquiring unit 181 acquires the information at any time thereafter.

(Control Unit 183)

A control unit 183 requests that a serving cell continue in the on state.

For example, the control unit 183 requests that a serving cell continue in the on state when a serving cell of the terminal device 100-7 is a cell associated with switching the on/off state.

For example, the control unit 183 requests the base station 200-7 (a base station of a serving cell) to continue in the on state of the serving cell. More specifically, for example, the control unit 183 transmits an on state continuation request message for requesting continuation of the on state to the base station 200-7 through the antenna unit 110 and the wireless communication unit 120.

<9.3. Configuration of Base Station>

Figure 24:
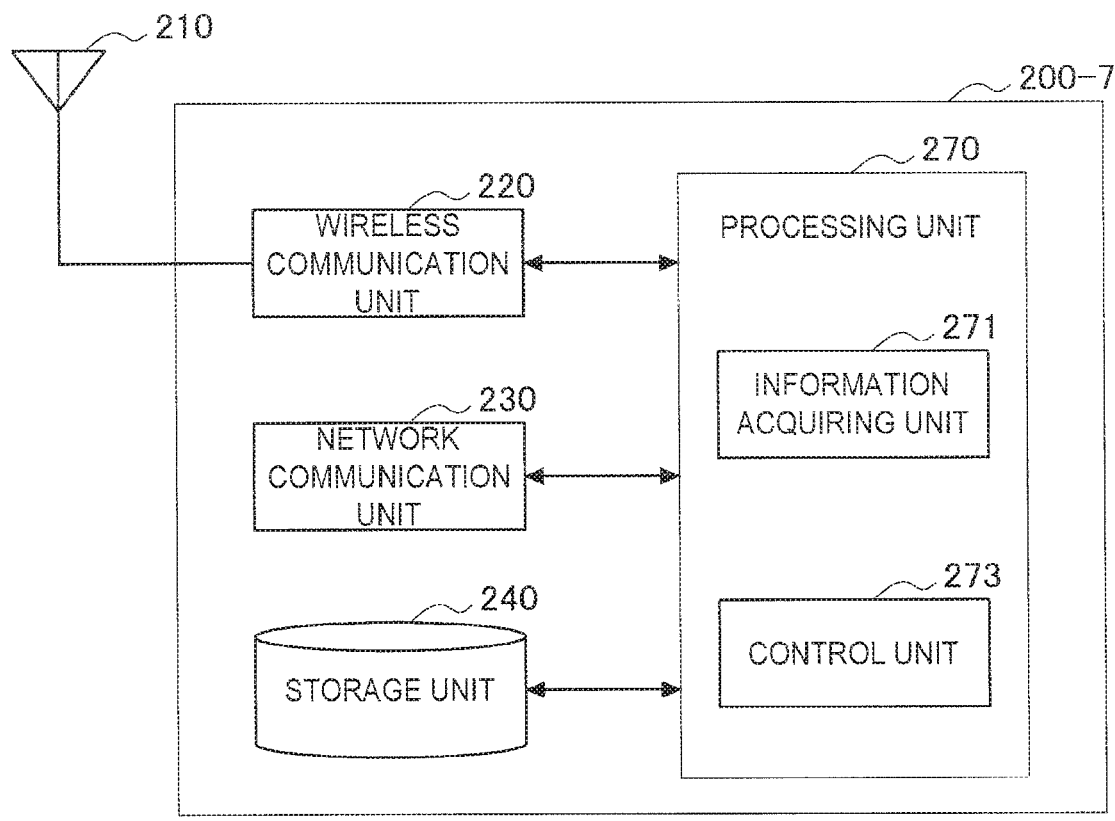
FIG. 24 is a block diagram illustrating an example of a configuration of a base station according to the seventh embodiment.

Next, an example of a configuration of the base station 200-7 according to the seventh embodiment will be described with reference to FIG. 24. FIG. 24 is a block diagram illustrating an example of a configuration of the base station 200-7 according to the seventh embodiment. Referring to FIG. 24, the base station 200-7 includes an antenna unit 210, a wireless communication unit 220, a network communication unit 230, a storage unit 240, and a processing unit 270.

There is no difference in descriptions of the antenna unit 210, the wireless communication unit 220, the network communication unit 230 and the storage unit 240 between the second embodiment and the seventh embodiment except for different reference numerals. Therefore, redundant descriptions will be omitted here, and only the processing unit 270 will be described.

(Processing Unit 270)

The processing unit 270 provides various functions of the base station 200-7. The processing unit 270 includes an information acquiring unit 271 and a control unit 273. The processing unit 270 may further include any other component in addition to the above-mentioned components. In other words, the processing unit 270 may also perform an operation other than operations of the above-mentioned components.

(Information Acquiring Unit 271)

The information acquiring unit 271 acquires a request for maintaining the on state of a cell from the terminal device 100-7. The cell is a cell of the base station 200-7.

For example, the request is the on state continuation request message for requesting continuation of the on state. Specifically, for example, the terminal device 100-7 transmits the on state continuation request message to the base station 200-7, and the information acquiring unit 271 acquires the on state continuation request message.

(Control Unit 273)

The control unit 273 maintains the on state of the cell (that is, a cell of the base station 200-7) in response to the request.

For example, the control unit 273 maintains the cell in the on state without switching the cell to the off state for a predetermined period according to the on state continuation request message.

The control unit 273 may determine whether the on state of the cell continues in response to the request, and may maintain the on state of the cell only when it is determined that the on state of the cell continues. In addition, the control unit 273 may notify the terminal device 100-7 of a result of the determination as a response to the request.

<9.4. Process Flow>

Figure 25:
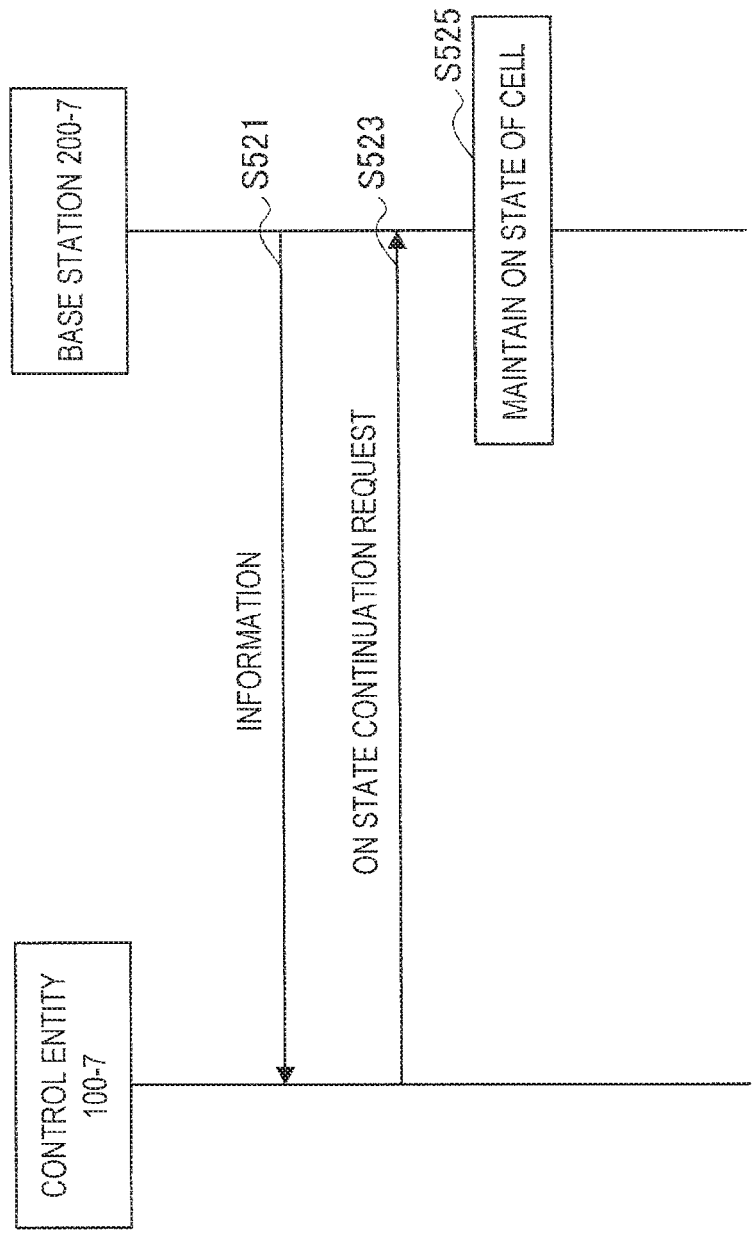
FIG. 25 is a sequence diagram illustrating an example of a schematic flow of a process according to the seventh embodiment.

Next, an example of a process according to the seventh embodiment will be described with reference to FIG. 25. FIG. 25 is a sequence diagram illustrating an example of a schematic flow of a process according to the seventh embodiment.

The base station 200-7 transmits information indicating that a cell of the base station 200-7 is a cell associated with switching the on/off state to the terminal device 100-7 (S521). The terminal device 100-7 (the information acquiring unit 181) acquires the information.

Then, the terminal device 100-7 (the control unit 183) requests that a serving cell continue in the on state (S523). For example, the terminal device 100-7 transmits an on state continuation request message for requesting continuation of the on state to the base station 200-7. The base station 200-7 (the information acquiring unit 271) acquires a request (that is, the on state continuation request message) from the terminal device 100-7.

The base station 200-7 (the control unit 273) maintains the on state of a cell of the base station 200-7 in response to the request (S525).

10. Application Examples

The technology according to the present disclosure is applicable to a variety of products. The control entity 300 may be implemented as any type of server such as tower servers, rack servers, and blade servers. At least a part of components of the control entity 300 may be implemented in a module (e.g. integrated circuit module that includes a single die, or card or blade that is inserted into a slot of a blade server) mounted on a server. In addition, the control entity 300 may be implemented as any of various base stations which will be described.

The base station 200 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 200 may be implemented as another type of base station such as Nodes B or base transceiver stations (BTSs). The base station 200 may include the main apparatus (which is also referred to as base station apparatus) that controls wireless communication and one or more remote radio heads (RRHs) that are disposed at different locations from that of the main apparatus. Further, various types of terminals as will be discussed later may temporarily or semi-persistently execute the base station function to operate as the base station 200. Further, at least part of components of the base station 200 may be implemented in a base station device or a module for the base station device.

The terminal device 100 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal device 100 may also be implemented as a terminal (which is also referred to as machine type communication (MTC) terminal) that performs machine to machine (M2M) communication. Furthermore, at least part of components of the terminal device 100 may be implemented as a module (e.g. integrated circuit module constituted with a single die) that is mounted on these terminals.

<10.1. Application Examples for Control Entity>

Figure 26:
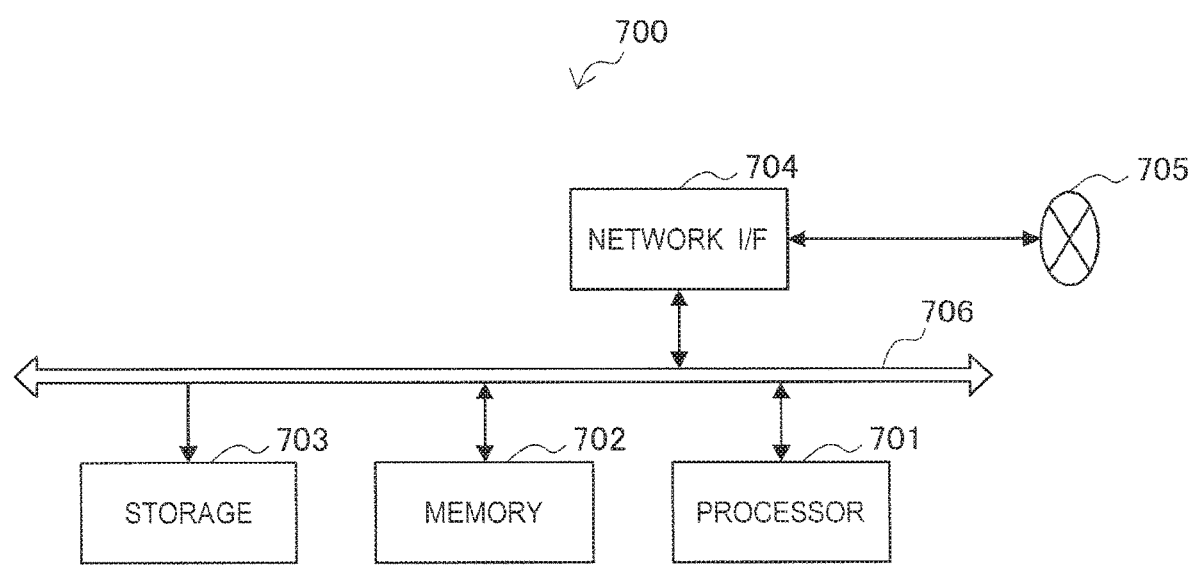
FIG. 26 is a block diagram illustrating an example of a schematic configuration of a server.

FIG. 26 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program executed by the processor 701 and data. The storage 703 can include a storage medium such as semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

In the server 700 illustrated in FIG. 26, one or more components (the information acquiring unit 331 and/or the control unit 333) included in the processing unit 330 described above with reference to FIG. 17 may be mounted in the processor 701. As an example, a program causing the processor to function as one or more of the components above (that is, a program causing the processor to perform the operation of one or more of the components above) may be installed in the server 700, and the processor 701 may execute the program. As another example, the server 700 may include a module including the processor 701 and the memory 702, and one or more of the components above may be mounted in the module. In this case, the module may store the program causing the processor to function as one or more of the components above in the memory 702, and the program may be executed by the processor 701. As described above, the server 700 or the module may be provided as an apparatus including one or more of the components above, and the program causing the processor to function as one or more of the components above may be provided. A readable recording medium in which the program is recorded may be provided.

<10.2. Application Examples for Base Station>

First Application Example

Figure 27:
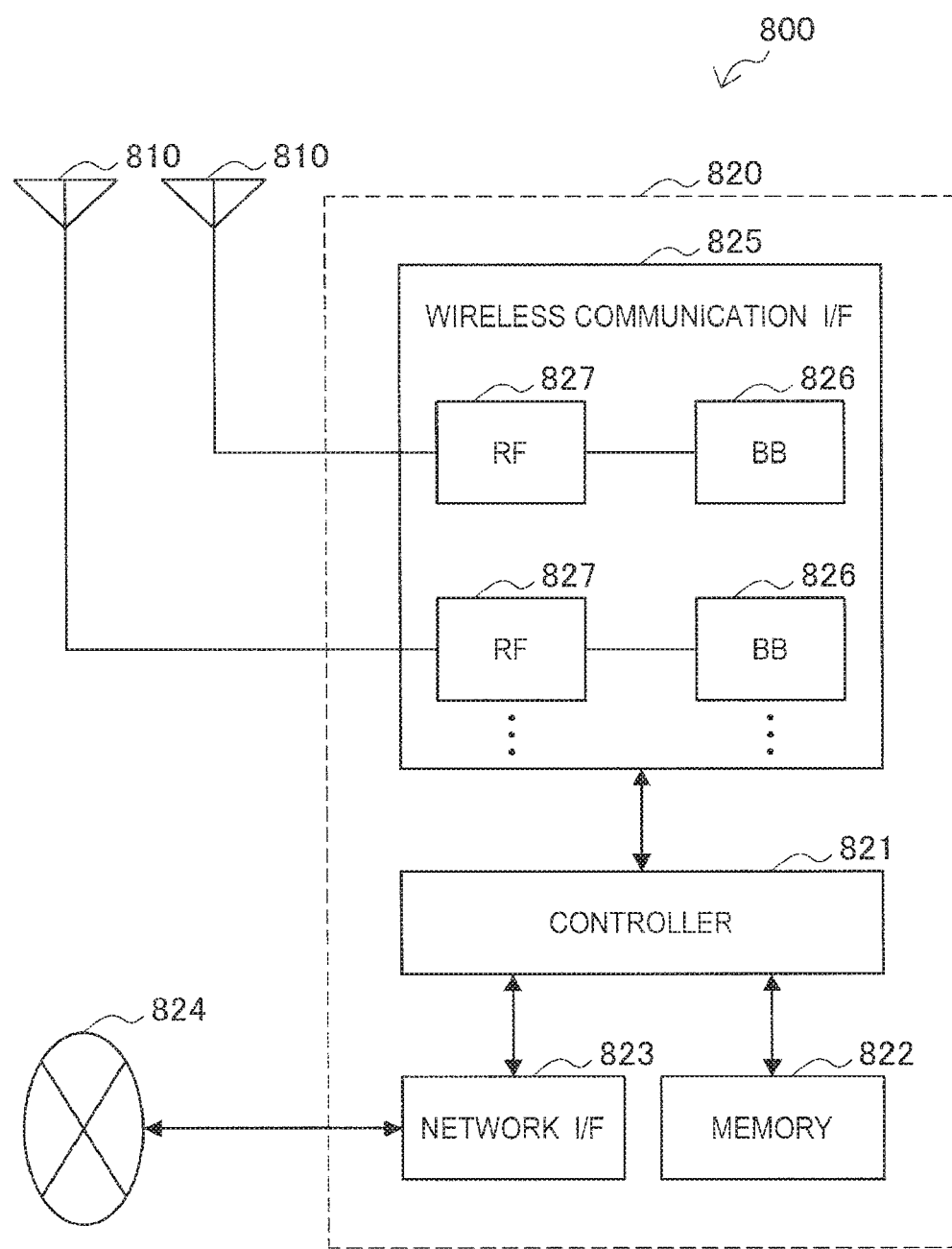
FIG. 27 is a block diagram illustrating a first example of a schematic configuration of an eNB.

FIG. 27 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 27, and the plurality of antennas 810 may, for example, correspond to a plurality of frequency bands used by the eNB 800. It should be noted that while FIG. 27 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 27, and the plurality of BB processors 826 may, for example, correspond to a plurality of frequency bands used by the eNB 800. The wireless communication interface 825 may also include a plurality of the RF circuits 827, as illustrated in FIG. 27, and the plurality of RF circuits 827 may, for example, correspond to a plurality of antenna elements. FIG. 27 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 27, one or more components included in the processing unit 250 described above with reference to FIG. 13 (the information acquiring unit 251 and/or the control unit 253) may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 800, and the wireless communication interface 825 (for example, the BB processor 826) and/or the controller 821 may execute the program. As described above, the eNB 800, the base station apparatus 820, or the module may be provided as an apparatus including one or more of the components above, and the program causing the processor to function as one or more of the components above may be provided. A readable recording medium in which the program is recorded may be provided. For these points, one or more components included in the processing unit 260 described above with reference to FIG. 19 (the information acquiring unit 261 and/or the control unit 263), and one or more components included in the processing unit 270 described above with reference to FIG. 24 (the information acquiring unit 271 and/or the control unit 273) are the same as one or more of the components above included in the processing unit 250.

In the eNB 800 illustrated in FIG. 27, the wireless communication unit 220 described above with reference to FIG. 13 may be mounted in the wireless communication interface 825 (for example, the RF circuit 827). The antenna unit 210 may be mounted in the antenna 810. The network communication unit 230 may be mounted in the controller 821 and/or the network interface 823.

Second Application Example

Figure 28:
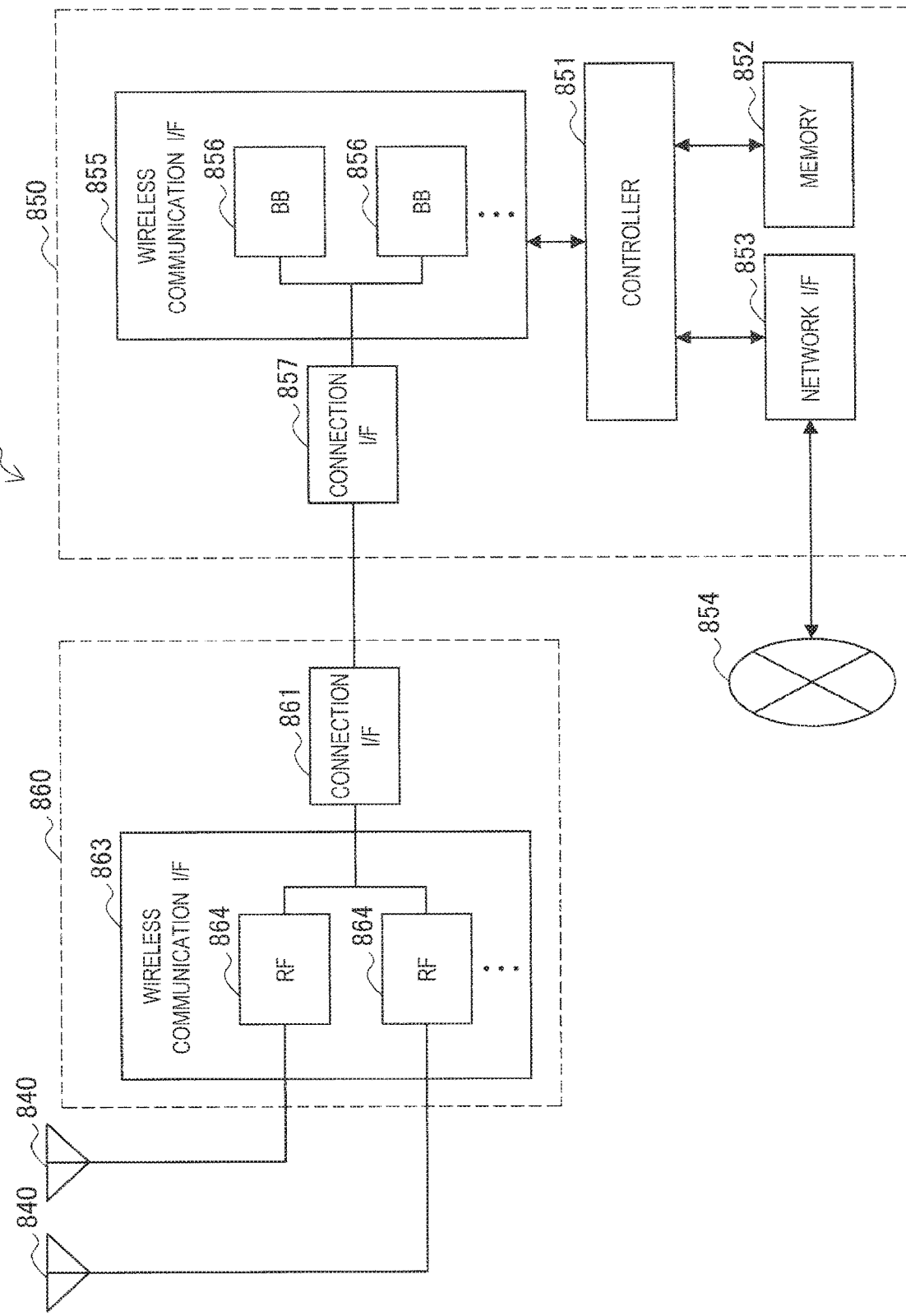
FIG. 28 is a block diagram illustrating a second example of the schematic configuration of the eNB.

FIG. 28 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 28, and the plurality of antennas 840 may, for example, correspond to a plurality of frequency bands used by the eNB 830. FIG. 28 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 27.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 27 except that the BB processor 856 is connected to an RF circuit 864 of the RRH 860 via the connection interface 857. The wireless communication interface 855 may include a plurality of the BB processors 856, as illustrated in FIG. 28, and the plurality of BB processors 856 may, for example, correspond to a plurality of frequency bands used by the eNB 830 respectively. FIG. 28 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 28, and the plurality of RF circuits 864 may, for example, correspond to a plurality of antenna elements. FIG. 28 illustrates an example in which the wireless communication interface 863 includes the plurality of RF circuits 864, but the wireless communication interface 863 may include the single RF circuit 864.

In the eNB 830 illustrated in FIG. 28, one or more components included in the processing unit 250 described above with reference to FIG. 13 (the information acquiring unit 251 and/or the control unit 253) may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 830, and the wireless communication interface 855 (for example, the BB processor 856) and/or the controller 851 may execute the program. As described above, the eNB 830, the base station apparatus 850, or the module may be provided as an apparatus including one or more of the components above, and the program causing the processor to function as one or more of the components above may be provided. A readable recording medium in which the program is recorded may be provided. In these points, one or more components included in the processing unit 260 described above with reference to FIG. 19 (the information acquiring unit 261 and/or the control unit 263), and one or more components included in the processing unit 270 described above with reference to FIG. 24 (the information acquiring unit 271 and/or the control unit 273) are the same as one or more of the components above included in the processing unit 250.

In the eNB 830 illustrated in FIG. 28, the wireless communication unit 220 described above with reference to FIG. 13 may be mounted in the wireless communication interface 863 (for example, the RF circuit 864). The antenna unit 210 may be mounted in the antenna 840. The network communication unit 230 may be mounted in the controller 851 and/or the network interface 853.

<7.3. Application Examples for Terminal Device>

First Application Example

Figure 29:
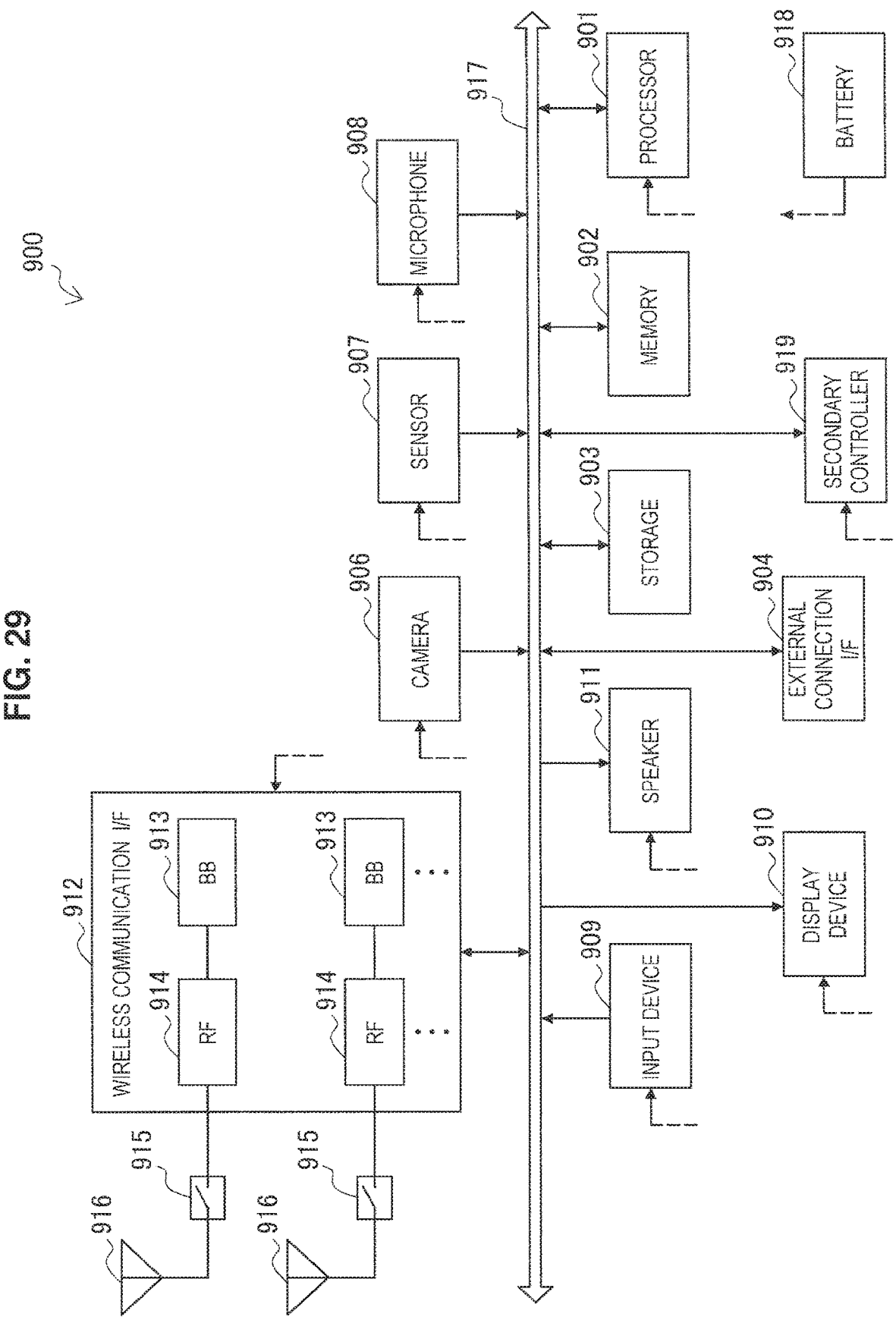
FIG. 29 is a block diagram illustrating an example of a schematic configuration of a smartphone.

FIG. 29 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 29. FIG. 29 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 29. FIG. 29 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 29 via a feeder line that is partially illustrated in the figure as a dashed line. The secondary controller 919, for example, operates a minimally necessary function of the smartphone 900 in a sleep mode.

In the smartphone 900 illustrated in FIG. 29, one or more components included in the processing unit 140 described above with reference to FIG. 10 (the information acquiring unit 141 and/or the control unit 143) may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the smartphone 900, and the wireless communication interface 912 (for example, the BB processor 913), the processor 901, and/or the secondary controller 919 may execute the program. As described above, the smartphone 900 or the module may be provided as an apparatus including one or more of the components above, and the program causing the processor to function as one or more of the components above may be provided. A readable recording medium in which the program is recorded may be provided. For these points, one or more components included in the processing unit 150 described above with reference to FIG. 12 (the information acquiring unit 151 and/or the control unit 153), one or more components included in the processing unit 160 described above with reference to FIG. 15 (the information acquiring unit 161 and/or the control unit 163), one or more components included in the processing unit 170 described above with reference to FIG. 21 (the information acquiring unit 171 and/or the control unit 173), and one or more components included in the processing unit 180 described above with reference to FIG. 23 (the information acquiring unit 181 and/or the control unit 183) are the same as one or more of the components above included in the processing unit 140.

In the smartphone 900 illustrated in FIG. 29, for example, the wireless communication unit 120 described above with reference to FIG. 10 may be mounted in the wireless communication interface 912 (for example, the RF circuit 914). The antenna unit 110 may be mounted in the antenna 916.

Second Application Example

Figure 30:
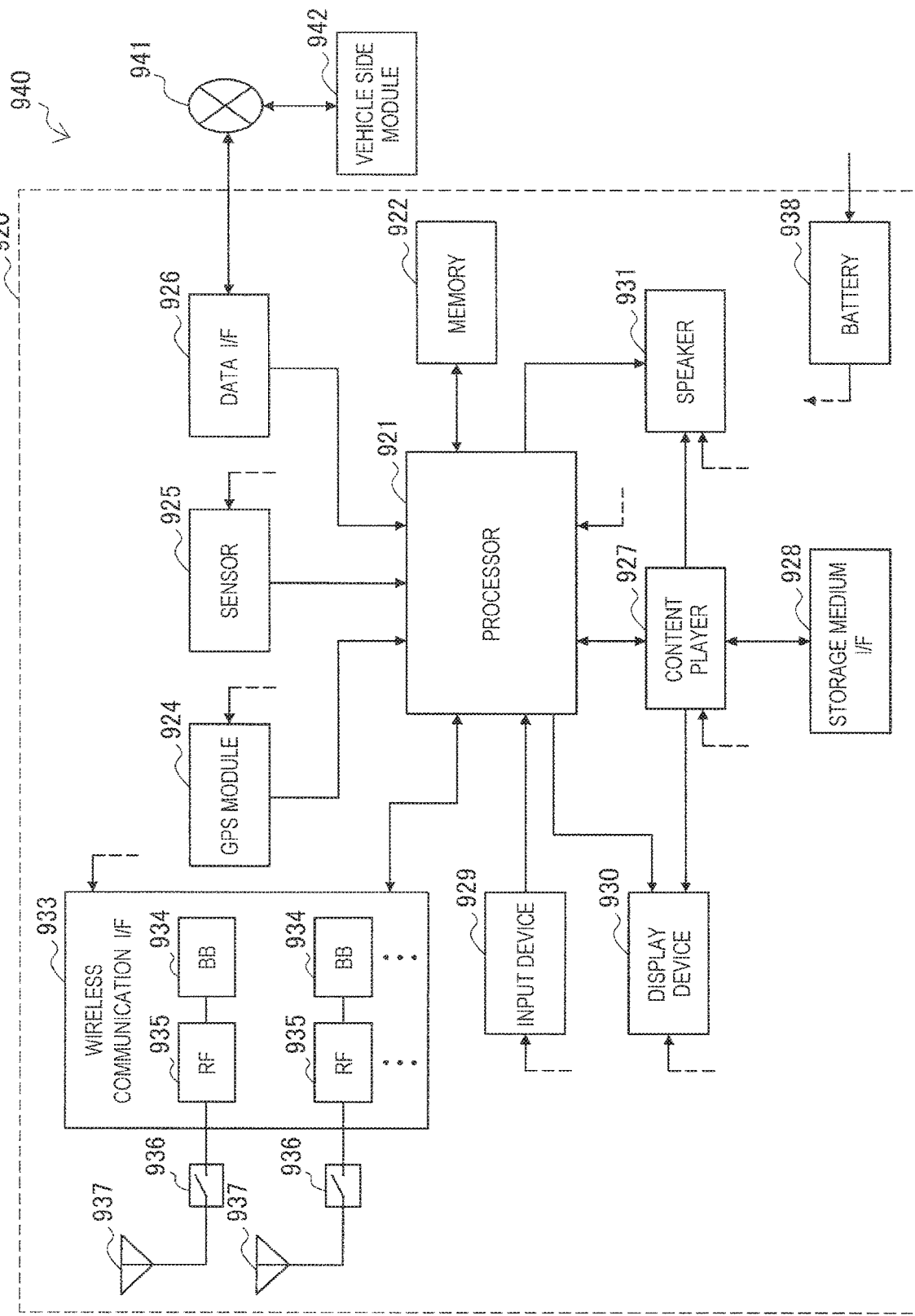
FIG. 30 is a block diagram illustrating an example of a schematic configuration of a car navigation apparatus.

FIG. 30 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 30. FIG. 30 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 30. FIG. 30 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 30 via a feeder line that is partially illustrated in the figure as a dashed line. The battery 950 accumulates the electric power supplied from the vehicle.

In the car navigation apparatus 920 illustrated in FIG. 30, one or more components included in the processing unit 140 described above with reference to FIG. 10 (the information acquiring unit 141 and/or the control unit 143) may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and/or the processor 921, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the car navigation apparatus 920, and the wireless communication interface 933 (for example, the BB processor 934), and/or the processor 921 may execute the program. As described above, the car navigation apparatus 920 or the module may be provided as an apparatus including one or more of the components above, and the program causing the processor to function as one or more of the components above may be provided. A readable recording medium in which the program is recorded may be provided. For these points, one or more components included in the processing unit 150 described above with reference to FIG. 12 (the information acquiring unit 151 and/or the control unit 153), one or more components included in the processing unit 160 described above with reference to FIG. 15 (the information acquiring unit 161 and/or the control unit 163), one or more components included in the processing unit 170 described above with reference to FIG. 21 (the information acquiring unit 171 and/or the control unit 173), and one or more components included in the processing unit 180 described above with reference to FIG. 23 (the information acquiring unit 181 and/or the control unit 183) are the same as one or more of the components above included in the processing unit 140.

In the car navigation apparatus 920 illustrated in FIG. 30, for example, the wireless communication unit 120 described above with reference to FIG. 12 may be mounted in the wireless communication interface 933 (for example, the RF circuit 935). The antenna unit 110 may be mounted in the antenna 937.

Further, the technique according to the present disclosure may be implemented as an in-vehicle system (or a vehicle) 940 including one or more blocks of the above-described car navigation apparatus 920, an in-vehicle network 941 and a vehicle side module 942. That is, the in-vehicle system (or the vehicle) 940 may be provided as an apparatus including one more of the components above included in the processing unit 140 (or the processing unit 150, the processing unit 160, the processing unit 170, or the processing unit 180). The vehicle side module 942 generates vehicle side data such as vehicle speed, engine speed and failure information and outputs the generated data to the in-vehicle network 961.

11. Conclusion

Each apparatus and each process according to the embodiments of the present disclosure have been described above with reference to FIGS. 9 to 30.

In the first embodiment, the terminal device 100-1 performs measurement reporting before a serving cell is in the off state. Accordingly, for example, it is possible to perform measurement reporting suitable for an environment in which the on/off state of a cell is switched. More specifically, for example, measurement reporting useful for selecting a new serving cell is performed.

In the second embodiment, the terminal device 100-2 performs measurement reporting according to a generation of a first event regarding a measurement result of a neighbour cell in the on state. In addition, the terminal device 100-2 performs measurement reporting according to a generation of a second event regarding a measurement result of a neighbour cell in the off state. The first event and the second event have different offsets or thresholds. Accordingly, for example, it is possible to perform measurement reporting suitable for an environment in which the on/off state of a cell is switched. More specifically, for example, measurement reporting of a cell in the off state is suppressed In the third embodiment, the terminal device 100-3 performs measurement reporting when predetermined conditions of traffic of the terminal device 100-3 are satisfied. Accordingly, for example, it is possible to perform measurement reporting suitable for an environment in which the on/off state of a cell is switched. More specifically, for example, measurement reporting useful for selecting a carrier (a cell) to be added according to an increase of traffic is performed.

In the fourth embodiment, the control entity 300-4 decides to switch the cell to the on state based on a measurement result of a cell in the off state and information about a buffer status of the terminal device 100-4, which are reported by the terminal device 100-4. Accordingly, for example, it is possible to more appropriately switch the on/off state of a cell. More specifically, for example, when a necessity is high, the cell in the off state is switched to the on state.

In the fifth embodiment, the base station 200-5 decides a candidate of a cell whose measurement is to be performed by the terminal device 100-5 or a priority of the candidate of the cell based on information about a schedule of the on/off state of the cell. In the sixth embodiment, the base station 200-6 decides a candidate of a cell whose measurement is to be performed by the terminal device 100-6 or a priority of the candidate of the cell based on information about a schedule of the on/off state of the cell. Accordingly, for example, it is possible to perform measurement reporting suitable for an environment in which the on/off state of a cell is switched. More specifically, for example, measurement reporting of a cell that is unlikely to be in the off state is performed rather than measurement reporting of a cell that is likely to be in the off state. As a result, a handover to the cell that is unlikely to be in the off state may be performed.

In the seventh embodiment, the terminal device 100-7 requests that a serving cell that is a cell associated with switching the on/off state continue in the on state. Accordingly, for example, the terminal device 100-7 can perform communication for a certain amount of time even in a cell associated with switching the on/off state.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while an example in which a control entity and a base station are separate devices has been described, the present disclosure is not limited thereto. For example, the control entity may be mounted in the base station.

For example, while an example in which a communication system supports LTE or LTE-A has been described in embodiments of the present disclosure, the present disclosure is not limited thereto. For example, the communication system may be a system that supports another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the terminal device, the base station or the control entity, or the modules thereof) in the present specification function as the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of one or more of the components (for example, an information acquiring unit and/or the control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquiring unit configured to acquire information indicating that a serving cell is scheduled to be in an off state; and a control unit configured to perform measurement reporting before the serving cell is in the off state.

(2)

The device according to (1), wherein the serving cell is a primary cell of carrier aggregation.

(3)

The device according to (1) or (2), wherein the serving cell is a small cell.

(4)

The device according to any one of (1) to (3), wherein the control unit performs measurement reporting according to a generation of an event indicating that a serving cell is scheduled to be in the off state.

(5)

The device according to any one of (1) to (4), wherein the measurement reporting is measurement reporting of a cell other than the serving cell.

(6)

A device including:

a control unit configured to perform measurement reporting according to a generation of a first event regarding a measurement result of a neighbour cell in an on state, wherein the control unit performs measurement reporting according to a generation of a second event regarding a measurement result of a neighbour cell in an off state, and the first event and the second event have different offsets or thresholds.

(7)

The device according to (6), wherein the second event has stricter generation conditions than the first event.

(8)

The device according to (6) or (7), wherein the neighbour cell in the on state becomes better than a serving cell by a first offset in the measurement result in the first event, the neighbour cell in the off state becomes better than the serving cell by a second offset in the measurement result in the second event, and the second offset is greater than the first offset.

(9)

The device according to (6) or (7), wherein the neighbour cell in the on state becomes better than a first threshold in the measurement result in the first event, the neighbour cell in the off state becomes better than a second threshold in the measurement result in the second event, and the second threshold is greater than the first threshold.

(10)

The device according to (6) or (7), wherein a serving cell becomes worse than a first threshold and the neighbour cell in the on state becomes better than a second threshold in the measurement result in the first event, the serving cell becomes worse than a third threshold and the neighbour cell in the off state becomes better than a fourth threshold in the measurement result in the second event, and the fourth threshold is greater than the second threshold or the third threshold is smaller than the first threshold.

(11)

The device according to (8) or (10), wherein the serving cell is a primary cell of carrier aggregation.

(12)

The device according to (6) or (7), wherein the neighbour cell in the on state becomes better than a secondary cell by a first offset in the measurement result in the first event, the neighbour cell in the off state becomes better than the secondary cell by a second offset in the measurement result in the second event, and the second offset is greater than the first offset.

(13)

A device including:

an acquiring unit configured to acquire an offset or a threshold for an event regarding a measurement result of a neighbour cell; and a control unit configured to notify a terminal device of the offset or the threshold, wherein the offset or the threshold includes an offset or a threshold for a first event regarding a measurement result of a neighbour cell in an on state and an offset or a threshold for a second event regarding a measurement result of a neighbour cell in an off state, and the offset or the threshold for the second event is different from the offset or the threshold for the first event.

(14)

A device including:

an acquiring unit configured to acquire information about traffic of a terminal device; and a control unit configured to perform measurement reporting when predetermined conditions of the information are satisfied.

(15)

The device according to (14), wherein the information about the traffic is a traffic load of the terminal device, and the predetermined conditions include a condition that the traffic load of the terminal device be equal to or greater than a threshold.

(16)

The device according to (14), wherein the information about the traffic is an amount of traffic of the terminal device, and the predetermined conditions include a condition that the amount of traffic of the terminal device be equal to or greater than a threshold.

(17)

The device according to (16), wherein the threshold is average throughput of the terminal device.

(18)

The device according to any one of (14) to (17), wherein the measurement reporting includes measurement reporting of a cell in an off state.

(19)

A device including:

an acquiring unit configured to acquire a measurement result of a cell in an off state and information about a buffer status of a terminal device, which are reported by the terminal device; and a control unit configured to decide to switch the cell to an on state based on the measurement result and the information.

(20)

The device according to (19), wherein the information is a buffer status report.

(21)

A device including:

an acquiring unit configured to acquire information about a schedule of an on/off state of a cell; and a control unit configured to decide a candidate of a cell whose measurement is to be performed by a terminal device or a priority of a candidate of the cell based on the information.

(22)

The device according to (21), wherein the information is information indicating a schedule of switching from an on state to an off state.

(23)

The device according to (22), wherein the control unit does not include a cell having a schedule of switching from the on state to the off state in the candidate of the cell or sets a priority of a cell having a schedule of switching from the on state to the off state to be lower.

(24)

The device according to (21), wherein the information is information indicating a time during which the on state of a cell continues.

(25)

The device according to (24), wherein the control unit does not include a cell whose on state continuation time arrives within a predetermined period in a candidate of the cell or sets a priority of the cell whose on state continuation time arrives within the predetermined period to be lower.

(26)

The device according to (24), wherein the control unit does not include a cell whose on state continuation time arrives within a period for the terminal device to transmit data in the candidate of the cell or sets a priority of the cell whose on state continuation time arrives within the period for the terminal device to transmit the data to be lower.

(27)

A device including:

an acquiring unit configured to acquire information indicating that a serving cell is a cell associated with switching of an on/off state; and a control unit configured to request that a serving cell continue in an on state.

(28)

A device including:

an acquiring unit configured to acquire a request for maintaining an on state of a cell from a terminal device; and a control unit configured to maintain the on state of the cell in response to the request.

(29)

The device according to any one of (1) to (5), wherein the device is a terminal device or a module for a terminal device.

(30)

A method including:

acquiring information indicating that a serving cell is scheduled to be in an off state; and performing, by a processor, measurement reporting before the serving cell is in the off state.

(31)
A program causing a processor to execute:
acquiring information indicating that a serving cell is scheduled to be in an off state; and
performing measurement reporting before the serving cell is in the off state.

(32)
A readable recording medium recording a program causing a processor to execute:
acquiring information indicating that a serving cell is scheduled to be in an off state; and
performing measurement reporting before the serving cell is in the off state.

(33)
The device according to any one of (6) to (12),
wherein the device is a terminal device or a module for a terminal device.

(34)
A method including:
performing, by a processor, measurement reporting according to a generation of a first event regarding a measurement result of a neighbour cell in an on state; and
performing, by a processor, measurement reporting according to a generation of a second event regarding a measurement result of a neighbour cell in an off state,
wherein the first event and the second event have different offsets or thresholds.

(35)
A program causing a processor to execute:
performing measurement reporting according to a generation of a first event regarding a measurement result of a neighbour cell in an on state; and
performing measurement reporting according to a generation of a second event regarding a measurement result of a neighbour cell in an off state,
wherein the first event and the second event have different offsets or thresholds.

(36)
A readable recording medium recording a program causing a processor to execute:
performing measurement reporting according to a generation of a first event regarding a measurement result of a neighbour cell in an on state; and
performing measurement reporting according to a generation of a second event regarding a measurement result of a neighbour cell in an off state,
wherein the first event and the second event have different offsets or thresholds.

(37)
The device according to (13),
wherein the device is a base station, a base station device for a base station or a module for the base station device.

(38)
A method including:
acquiring an offset or a threshold for an event regarding a measurement result of a neighbour cell; and
notifying, by a processor, a terminal device of the offset or the threshold,
wherein the offset or the threshold includes an offset or a threshold for a first event regarding a measurement result of a neighbour cell in an on state and an offset or a threshold for a second event regarding a measurement result of a neighbour cell in an off state, and
the offset or the threshold for the second event is different from the offset or the threshold for the first event.

(39)
A program causing a processor to execute:
acquiring an offset or a threshold for an event regarding a measurement result of a neighbour cell; and notifying a terminal device of the offset or the threshold,
wherein the offset or the threshold includes an offset or a threshold for a first event regarding a measurement result of a neighbour cell in an on state and an offset or a threshold for a second event regarding a measurement result of a neighbour cell in an off state, and
the offset or the threshold for the second event is different from the offset or the threshold for the first event.

(40)
A readable recording medium recording a program causing a processor to execute:
acquiring an offset or a threshold for an event regarding a measurement result of a neighbour cell; and
notifying a terminal device of the offset or the threshold,
wherein the offset or the threshold includes an offset or a threshold for a first event regarding a measurement result of a neighbour cell in an on state and an offset or a threshold for a second event regarding a measurement result of a neighbour cell in an off state, and
the offset or the threshold for the second event is different from the offset or the threshold for the first event.

(41)
The device according to any one of (14) to (18),
wherein the device is the terminal device or a module for the terminal device.

(42)
A method including:
acquiring information about traffic of a terminal device; and
performing, by a processor, measurement reporting when predetermined conditions of the information are satisfied.

(43)
A program causing a processor to execute:
acquiring information about traffic of a terminal device; and
performing measurement reporting when predetermined conditions of the information are satisfied.

(44)
A readable recording medium recording a program causing a processor to execute:
acquiring information about traffic of a terminal device; and
performing measurement reporting when predetermined conditions of the information are satisfied.

(45)
A method including:
acquiring a measurement result of a cell in an off state and information about a buffer status of a terminal device, which are reported by the terminal device; and
deciding, by a processor, to switch the cell to an on state based on the measurement result and the information.

(46)
A program causing a processor to execute:
acquiring a measurement result of a cell in an off state and information about a buffer status of a terminal device, which are reported by the terminal device; and
deciding to switch the cell to an on state based on the measurement result and the information.

(47)
A readable recording medium recording a program causing a processor to execute:
acquiring a measurement result of a cell in an off state and information about a buffer status of a terminal device, which are reported by the terminal device; and deciding to switch the cell to an on state based on the measurement result and the information.

(48)
The device according to any one of (21) to (26), wherein the device is a base station, a base station device for a base station or a module for the base station device.

(49)
The device according to any one of (21) to (26), wherein the device is the terminal device or a module for the terminal device.

(50)
A method including:
acquiring information about a schedule of an on/off state of a cell; and
deciding, by a processor, a candidate of a cell whose measurement is to be performed by a terminal device or a priority of the candidate of the cell based on the information.

(51)
A program causing a processor to execute:
acquiring information about a schedule of an on/off state of a cell; and
deciding a candidate of a cell whose measurement is to be performed by a terminal device or a priority of the candidate of the cell based on the information.

(52)
A readable recording medium recording a program causing a processor to execute:
acquiring information about a schedule of an on/off state of a cell; and
deciding a candidate of a cell whose measurement is to be performed by a terminal device or a priority of the candidate of the cell based on the information.

(53)
The device according to (27),
wherein the device is a terminal device or a module for a terminal device.

(54)
A method including: acquiring information indicating that a serving cell is a cell associated with switching of an on/off state; and requesting, by a processor, that a serving cell continue in an on state.

(55)
A program causing a processor to execute:
acquiring information indicating that a serving cell is a cell associated with switching of an on/off state; and
requesting that a serving cell continue in an on state.

(56)
A readable recording medium recording a program causing a processor to execute:
acquiring information indicating that a serving cell is a cell associated with switching of an on/off state; and
requesting that a serving cell continue in an on state.

(57)
The device according to (28),
wherein the device is a base station, a base station device for the base station or a module for the base station device.

(58)
A method including: acquiring a request for maintaining an on state of a cell from a terminal device; and
maintaining, by a processor, the on state of the cell in response to the request.

(59)
A program causing a processor to execute:
acquiring a request for maintaining an on state of a cell from a terminal device; and
maintaining the on state of the cell in response to the request.

(60)
A readable recording medium recording a program causing a processor to execute:
acquiring a request for maintaining an on state of a cell from a terminal device; and
maintaining the on state of the cell in response to the request.

REFERENCE SIGNS LIST

1 communication system
100 terminal device
141, 151, 161, 171, 181 information acquiring unit
143, 153, 163, 173, 183 control unit
200 base station
251, 261, 271 information acquiring unit
253, 263, 273 control unit
300 control entity
331 information acquiring unit
333 control unit

The invention claimed is:
1. A method for a user equipment, the method comprising:
aggregating a primary cell and a secondary cell in an on state for the user equipment;
receiving, from a base station, a Radio Resource Control (RRC) message comprising:
first information indicating a first offset used for reporting a first measurement result of a first channel quality measurement in the secondary cell in the on state, and
second information indicating a second offset used for reporting a second measurement result of a second channel quality measurement in the secondary cell in an off state;
measuring the first channel quality measurement in the secondary cell in the on state if the secondary cell is in the on state for the user equipment;
measuring the second channel quality measurement in the secondary cell in the off state if the secondary cell is in the off state for the user equipment;
reporting the first measurement result using the first offset; and
reporting the second measurement using the second offset, wherein
the first information indicating the first offset is different from the second information indicating the second offset.

2. The method according to claim 1, wherein the second channel quality measurement in the secondary cell in the off state is performed for fast transition of the secondary cell to the on state for the user equipment.

3. The method according to claim 2, wherein the on state of the secondary cell is an activated state of the secondary cell.

4. A method for a base station, the method comprising:
transmitting, to a user equipment aggregating a primary cell and a secondary cell in an on state, a Radio Resource Control (RRC) message comprising:
first information indicating a first offset used for reporting a first measurement result of a first channel quality measurement in the secondary cell in the on state, and
second information indicating a second offset used for reporting a second measurement result of a second channel quality measurement in the secondary cell in an off state;
receiving a report of the first measurement result based on a determination by the user equipment using the first offset, the first channel quality measurement in the on state being performed by the user equipment if the secondary cell is the on state for the user equipment; and receiving a report of the second measurement result based on a second determination by the user equipment using the second offset, the second channel quality measurement in the off state being performed by the user equipment if the secondary cell is the off state for the user equipment, wherein the first information indicating the first offset is different from the second information indicating the second offset.

5. The method according to claim 4, wherein the second channel quality measurement in the secondary cell in the off state is performed for fast transition of the secondary cell to the on state for the user equipment.

6. The method according to claim 5, wherein the on state of the secondary cell is an activated state of the secondary cell for the user equipment.

7. A user equipment comprising:
a radio transceiver; and
a hardware processor configured to:
   aggregate a primary cell and a secondary cell in an on state for the user equipment;
   receive, from a base station via the radio transceiver, a Radio Resource Control (RRC) message comprising:
     first information indicating a first offset used for reporting a first measurement result of a first channel quality measurement in the secondary cell in the on state, and
     second information indicating a second offset used for reporting a second measurement result of a second channel quality measurement in the secondary cell in an off state;
   measure the first channel quality measurement in the secondary cell in the on state if the secondary cell is the on state for the user equipment;
   measure the second channel quality measurement in the secondary cell in the off state if the secondary cell is the off state for the user equipment;
   report, to the base station via the radio transceiver, the first measurement result based on a determination using the first offset; and
   report, to the base station via the radio transceiver, the second measurement result based on a second determination using the second offset, wherein the first information indicating the first offset is different from the second information indicating the second offset.

8. A base station comprising:
a radio transceiver; and
a hardware processor configured to:
   transmit, via the radio transceiver to a user equipment aggregating a primary cell and a secondary cell in an on state, a Radio Resource Control (RRC) message comprising:
     first information indicating a first offset used for reporting a first measurement result of a first channel quality measurement in the secondary cell in the on state, and
     second information indicating a second offset used for reporting a second measurement result of a second channel quality measurement in the secondary cell in an off state;
   receiving, from the user equipment via the radio transceiver, a report of the first measurement result based on a determination by the user equipment using the first offset, the first channel quality measurement in the on state being performed by the user equipment if the secondary cell is the on state for the user equipment; and
   receiving, from the user equipment via the radio transceiver, a report of the second measurement result based on a second determination by the user equipment using the second offset, the second channel quality measurement in the off state being performed by the user equipment if the secondary cell is the off state for the user equipment, wherein the first information indicating the first offset is different from the second information indicating the second offset.

\* \* \* \* \*